United States Patent
Suda et al.

(10) Patent No.: US 8,058,217 B2
(45) Date of Patent: *Nov. 15, 2011

(54) METAL WORKING FLUID

(75) Inventors: Satoshi Suda, Yokohama (JP); Hideo Yokota, Yokohama (JP); Masanori Ibi, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 816 days.

This patent is subject to a terminal disclaimer.

(21) Appl. No.: 10/584,305

(22) PCT Filed: Dec. 20, 2004

(86) PCT No.: PCT/JP2004/019040
§ 371 (c)(1),
(2), (4) Date: Jun. 23, 2006

(87) PCT Pub. No.: WO2005/063947
PCT Pub. Date: Jul. 14, 2005

(65) Prior Publication Data
US 2007/0191240 A1    Aug. 16, 2007

(30) Foreign Application Priority Data

Dec. 25, 2003  (JP) .................. 2003-430967
Feb. 23, 2004  (JP) .................. 2004-046903

(51) Int. Cl.
C10M 105/38   (2006.01)
C10M 101/04   (2006.01)
C10M 169/04   (2006.01)
C10M 135/22   (2006.01)

(52) U.S. Cl. ......... 508/485; 508/486; 508/433; 508/569
(58) Field of Classification Search .......... 508/485, 508/486, 433, 569
See application file for complete search history.

(56) References Cited

U.S. PATENT DOCUMENTS

| | | | |
|---|---|---|---|
| 4,506,533 A | 3/1985 | Hessel et al. | |
| 5,538,654 A * | 7/1996 | Lawate et al. | 508/308 |
| 6,300,292 B2 * | 10/2001 | Konishi et al. | 508/371 |
| 6,383,992 B1 * | 5/2002 | Garmier et al. | 508/491 |
| 2002/0035043 A1 * | 3/2002 | Yokota et al. | 508/485 |

FOREIGN PATENT DOCUMENTS

| | | |
|---|---|---|
| JP | 62-100596 | 5/1987 |
| JP | 6-158074 | 6/1994 |
| JP | 7-157790 | 6/1995 |

(Continued)

OTHER PUBLICATIONS

Papers of Annual conference of the Japan Society of Mechanical Engineers, vol. 2003, No. 4, Aug. 5, 2003, pp. 181-182.

(Continued)

*Primary Examiner* — Glenn Caldarola
*Assistant Examiner* — Vishal Vasisth
(74) *Attorney, Agent, or Firm* — Finnegan, Henderson, Farabow, Garrett & Dunner, LLP

(57) ABSTRACT

The oil for metal working according to the invention is an oil for metal working comprising a triester of fatty acids and glycerin, wherein the content of oleic acid in the fatty acids is 40-98% by mass based on the total amount of the fatty acids. The oil for metal working of the invention can achieve a high level of machining performance without using a chlorine-based extreme pressure agent.

8 Claims, 3 Drawing Sheets

FOREIGN PATENT DOCUMENTS

| | | |
|---|---|---|
| JP | 8-208563 | 3/1996 |
| JP | 8-311466 | 11/1996 |
| JP | 11-080764 | 3/1999 |
| JP | 2001-192686 | 7/2001 |
| JP | 2001-192690 | 7/2001 |
| WO | WO98/10043 | 3/1998 |
| WO | WO 01/30945 | 5/2001 |
| WO | WO 01/88068 | 11/2001 |
| WO | WO 02/00815 | 1/2002 |
| WO | WO 02/081605 | 10/2002 |
| WO | WO 02/083823 | 10/2002 |

OTHER PUBLICATIONS

Oleoscience, vol. 1, No. 2, 2001, pp. 57-67.
Oleochemical Handbook, Rev. $3^{rd}$ Ed., Maruzen Co., Ltd. 1990, pp. 104-105.
Search Report dated Jul. 6, 2010.
Japanese Office Action dated Feb. 26, 2010.
Japanese Office Action dated Sep. 7, 2010.
"Fat and Oil Food Handbook," Saiwai Shobo Co., Ltd., $1^{st}$ ed., 1988, pp. 330-334.
Japanese Office Action dated Jan. 25, 2011.

* cited by examiner

METAL WORKING FLUID

This application is a 371 of PCT/JP04/19040, filed Dec. 20, 2004.

TECHNICAL FIELD

The present invention relates to an oil for metal working.

BACKGROUND ART

Metal working processes include cutting, grinding, roll forming, forging, pressing, punching, rolling and the like, and such types of metal working are usually carried out using lubricating oils. In cutting and grinding, for example, it is common to employ cutting and grinding oils for the purpose of extending the life of working tools such as drills, end mills, cutting tools, grinding wheels and the like, improving the surface roughness of working surfaces and raising productivity in mechanical working by increasing machining performance.

Conventional oils for metal working employ large amounts of chlorine-based extreme pressure agents such as chlorinated paraffin and sulfur-based extreme pressure agents such as sulfidized oils and polysulfides. The use of chlorine-based extreme pressure agents is considered indispensable particularly for difficult machining such as shaving, deep hole boring (BTA working, gun drill working), automatic lathe working, broaching and screw roll forming or heavy machining, or for machining of difficult-to-cut materials and/or difficult-to-grind materials such as heat-resistant alloys including stainless steel or inconel.

In recent years, however, concerns have been raised regarding carcinogenicity of the chlorine-based extreme pressure agents contained in oils for metal working, or regarding generation of dioxin by thermal disposal of chlorine-based waste solutions, and therefore it has been desired to develop metal working techniques that do not employ chlorine-based extreme pressure agents.

Development of new oils for metal working that do not employ chlorine-based extreme pressure agents is progressing as a way of satisfying this demand, and for example, the use of oils for metal working that combine sulfur-based extreme pressure agents and sulfonates has been proposed (for example, see Patent document 1).

On the other hand, there have also been developed cutting/grinding methods with minimal quantity lubricant systems whereby a trace amount of oil at about 1/100,000-1/1,000,000 of the amount of oil used for conventional cutting and grinding is supplied to the working part together with a compressed fluid (for example, compressed air) for cutting and grinding. In such systems, a cooling effect is achieved due to the compressed air, and the trace amount of oil used allows the amount of waste to be reduced, thereby resulting in improvement in the effect on the environment that is caused by large-scale emission of waste products (for example, see Patent document 2).

[Patent document 1] Japanese Unexamined Patent Publication HEI No. 6-158074
[Patent document 2] WO02/081605

DISCLOSURE OF THE INVENTION

Problems to be Solved by the Invention

In recent years, however, the level of machining performance required in metal working fields has continued to increase, and it has not been easy to achieve adequate machining performance even using the type of oil described in Patent document 1 mentioned above. Moreover, even with the cutting/grinding method employing a minimal quantity lubricant system as described in Patent document 2 mentioned above, no oil yet exists which can provide satisfactory machining performance.

It is therefore an object of the present invention, which has been accomplished in light of these circumstances, to provide a metal working oil composition that can achieve a high level of machining performance without using chlorine-based extreme pressure agents.

Means for Solving the Problems

As a result of much diligent research directed toward achieving the object stated above, the present inventors have discovered that the aforementioned problems can be solved with an oil comprising a glycerin triester having a specific fatty acid composition, and we have thereupon completed this invention.

Specifically, the oil for metal working according to the invention is an oil for metal working comprising a triester of fatty acids and glycerin, characterized in that the content of oleic acid in the fatty acids is 40-98% by mass based on the total amount of the fatty acids.

The oil for metal working of the invention preferably also contains a hydrocarbon oil, in which case the content of the triester is preferably 1-50% by mass based on the total amount of the composition. An oil for metal working of the invention having this construction can further improve the machining performance without using a chlorine-based extreme pressure agent, so that a superior balance can be achieved between increase in working efficiency, lengthening of tool life and improvement in handleability.

Also, in the oil for metal working of the invention, the content of linoleic acid in the fatty acids is preferably 1-60% by mass based on the total amount of the fatty acids. By adding a triester with this manner of fatty acid composition, it is possible to achieve an even superior balance between increase in working efficiency, lengthening of tool life and improvement in handleability.

Also, in the oil for metal working of the invention, the content of C1-C16 fatty acids in the fatty acids is preferably 0.1-30% by mass based on the total amount of the fatty acids. By adding a triester with this manner of fatty acid composition, it is possible to achieve an even more superior balance between increase in working efficiency, lengthening of tool life and improvement in handleability.

Also, in the oil for metal working of the invention, the content of C6-C16 fatty acids in the fatty acids is preferably 0.1-30% by mass based on the total amount of the fatty acids. By adding a triester with this manner of fatty acid composition, it is possible to achieve yet an even more superior balance between increase in working efficiency, lengthening of tool life and improvement in handleability.

The oil for metal working of the invention also preferably contains a monoester and/or diester from the standpoint of further improving handleability.

Because the oil for metal working of the invention has the excellent properties described above, it may be suitably used as an oil for cutting, an oil for grinding or an oil for roll forming.

Moreover, because the oil for metal working of the invention has the excellent properties described above, it may be suitably used as an oil for heavy machining, an oil for difficult machining or an oil for machining of difficult-to-cut materials and/or difficult-to-gring materials.

Furthermore, because the oil for metal working of the invention has the excellent properties described above, it may be suitably used as an oil for metal working to be used in a minimal quantity lubricant system.

Effect of the Invention

According to the invention there is provided a metal working oil composition that can achieve a high level of machining performance without using chlorine-based extreme pressure agents.

EXPLANATION OF SYMBOLS

Figure 1:
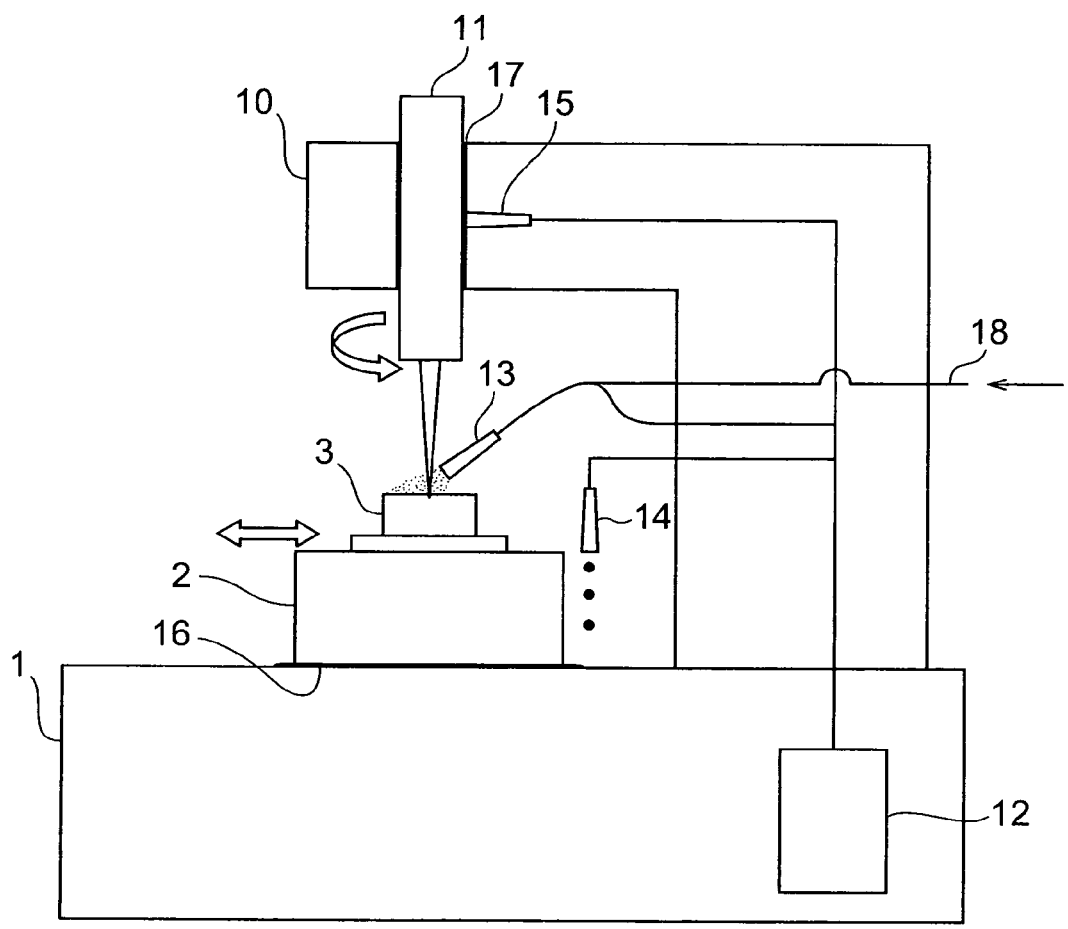
FIG. 1 is a schematic diagram showing an example of a machine tool suitable for use in a cutting/grinding method with a minimal quantity lubricant system.

1: Bed, 2: table, 3: workpiece, 3b: weight, 4: A/C servo meter, 5: feed screw, 6: mobile jig, 7: control board, 8: control means, 9: load cell, 10: support means, 11: tool, 12: oil feeding tank, 13: working oil feeding section, 14: sliding surface oil feeding section, 15: bearing oil feeding section, 16: sliding surface, 17: bearing section, 18: compressed air injection port.

BEST MODE FOR CARRYING OUT THE INVENTION

Preferred embodiments of the invention will now be described in detail.

The oil for metal working according to a first embodiment of the invention is an oil for metal working comprising a triester of fatty acids and glycerin, characterized in that the content of oleic acid in the fatty acids is 40-98% by mass based on the total amount of the fatty acids.

The oil for metal working according to the first embodiment includes a triester of fatty acids and glycerin (hereinafter referred to simply as "triester"), with 40-98% by mass of the fatty acid consisting of oleic acid. By using such a triester it is possible to achieve a superior balance between increase in working efficiency, lengthening of tool life and handleability. From the viewpoint of achieving a superior balance between increase in working efficiency, lengthening of tool life and handleability, the oleic acid content in the fatty acids composing the triester is preferably at least 50% by mass, more preferably at least 60% by mass and even more preferably at least 70% by mass, while from the same viewpoint it is preferably no greater than 95% by mass and more preferably no greater than 90% by mass.

The contents of oleic acid, and of linoleic acid, etc. described hereunder in the fatty acid of the triester according to the invention (hereinafter referred to as "constituent fatty acid") are measured in a manner based on the Standard Fat and Oil Analysis Methods 2.4.2, "Fatty Acid Composition", established by the Japan Oil Chemists' Society.

The fatty acids other than oleic acid of the constituent fatty acid of the triester of the invention are not particularly restricted so long as the working efficiency, tool life and handleability are not impaired, but C6-C24 fatty acids are preferred. The C6-C24 fatty acids may be saturated fatty acids, or they may be unsaturated fatty acids with 1-5 unsaturated bonds. The fatty acids may also be either straight-chain or branched. They may also contain 1-3 hydroxyl groups (—OH) in the molecule in addition to carboxyl groups (—COOH). As such fatty acids there may be mentioned, specifically, caproic acid, caprylic acid, capric acid, lauric acid, myristic acid, palmitic acid, stearic acid, arachidic acid, behenic acid, lignoceric acid, lauroleic acid, myristoleic acid, palmitoleic acid, gadoleic acid, erudic acid, ricinolic acid, linoleic acid, linolenic acid, oleostearic acid, licanic acid, arachidonic acid and clupanodoic acid. Linoleic acid is preferred among these fatty acids from the viewpoint of achieving a superior balance between working efficiency, tool life and handleability, and more preferably linoleic acid constitutes 1-60% by mass (more preferably 2-50% by mass, and even more preferably 4-40% by mass) of the constituent fatty acids of the triester.

Also from the viewpoint of achieving a superior balance between working efficiency, tool life and handleability, C6-C16 fatty acids preferably constitute 0.1-30% by mass (more preferably 0.5-20% by mass and even more preferably 1-10% by mass of the constituent fatty acids in the triester of the invention.

Furthermore, the total degree of unsaturation of the triester of the invention is preferably no greater than 0.3, and more preferably no greater than 0.2. If the total degree of unsaturation of the triester is greater than 0.3, the handleability of the oil for metal working of the invention will tend to be impaired. The total degree of unsaturation according to the invention is the total degree of unsaturation measured according to the "Testing method of polyether for polyurethane" (JIS K1557-1970), using the same apparatus and procedure, except that a triester was used instead of a polyether for polyurethane.

The triester of the invention may be a synthetically obtained oil or a triester-containing natural oil such as a vegetable oil, so long as the content of oleic acid of the constituent fatty acid satisfies the conditions specified above, but from the standpoint of human safety it is preferred to use a natural oil such as a vegetable oil. Preferred vegetable oils include rapeseed oil, sunflower oil, soybean oil, corn oil and canola oil, among which sunflower oil and rapeseed oil are particularly preferred.

Although most natural vegetable oils have a total degree of unsaturation exceeding 0.3, their total degree of unsaturation can be reduced by treatment such as hydrogenation in a refining step. In addition, vegetable oils with low total degrees of unsaturation can be easily produced by cross-breeding and gene recombinant techniques. Examples include high-oleic-acid canola oil with a degree of unsaturation of no greater than 0.3 and an oleic acid content of 70% by mass or greater, and high-oleic-acid rapeseed oil, high-oleic-acid sunflower oil and high-oleic-acid soybean oil having contents of 80% by mass and greater.

The oil for metal working according to the first embodiment may consist entirely of the aforementioned triester, but base oils other than triesters may also be used therewith so long as the working efficiency, tool life and handleability are not impaired. Such base oils may be mineral oils or synthetic oils, or mixtures thereof. From the standpoint of handleability, the content of the triester of the invention is preferably no greater than 100% by mass, more preferably no greater than 90% by mass, even more preferably no greater than 80% by mass, yet more preferably no greater than 70% by mass and most preferably no greater than 60% by mass, based on the total amount of the oil. From the standpoint of increasing working efficiency and extending tool life, the content of the triester of the invention is preferably at least 30% by mass, more preferably at least 35% by mass, even more preferably at least 40% by mass and yet more preferably at least 45% by mass, based on the total amount of the oil.

As examples of mineral oils to be used for the invention there may be mentioned paraffin-based mineral oils or naphthene-based mineral oils which are lube-oil distillates obtained by atmospheric distillation and vacuum distillation of crude oil, with refinement by appropriate combinations of refining treatments such as solvent deasphalting, solvent extraction, hydrocracking, solvent dewaxing, catalytic dewaxing, hydrogenation refining, sulfuric acid cleaning and clay treatment.

As synthetic oils to be used for the invention there may be mentioned, specifically, poly α-olefins such as propylene oligomer, polybutene, polyisobutylene, 1-octene oligomer, 1-decene oligomer, ethylene and propylene co-oligomer, ethylene and 1-octene co-oligomer, ethylene and 1-decene co-oligomer, or their hydrogenated products; isoparaffin; alkylbenzenes such as monoalkylbenzenes, dialkylbenzenes and polyalkylbenzenes; alkylnaphthalenes such as monoalkylnaphthalenes, dialkylnaphthalenes and polyalkylnaphthalenes; dibasic acid esters such as dioctyl adipate, di-2-ethylhexyl adipate, diisodecyl adipate, ditridecyl adipate, di-2-ethylhexyl sebacate and ditridecyl glutarate; tribasic acid esters such as trimellitic acid; polyol esters such as trimethylolpropane caprylate, trimethylolpropane pelargonate, pentaerythritol2-ethyl hexanoate and pentaerythritol pelargonate; polyglycols such as polyethylene glycol, polypropylene glycol, polyoxyethyleneoxypropylene glycol, polyethyleneglycol monoether, polypropyleneglycol monoether, polyoxyethyleneoxypropyleneglycol monoether, polyethyleneglycol diether, polypropyleneglycol diether and polyoxyethyleneoxypropyleneglycol diether; phenylethers such as monoalkyldiphenylethers, dialkyldiphenylethers, monoalkyltriphenylethers, dialkyltriphenylethers, tetraphenylether, monoalkyltetraphenylethers, dialkyltetraphenylethers and pentaphenylether; silicone oils; fluoroethers such as perfluoroether, and the like, and these may be used alone or in combinations of two or more.

Preferred among the base oils mentioned above are monoesters and/or diesters, more preferably esters (i)-(iii) listed below and even more preferably (i) and (iii), from the standpoint of further improving handleability.
(i) Esters of monohydric alcohols and monobasic acids
(ii) Esters of dihydric alcohols and monobasic acids
(iii) Esters of monohydric alcohols and dibasic acids As monohydric alcohols composing esters (i) and (iii) there are usually employed C1-C24, preferably C1-C12 and more preferably C1-C8 monohydric alcohols, and such alcohols may be straight-chain or branched, and either saturated or unsaturated. As specific examples of C1-C24 alcohols there may be mentioned methanol, ethanol, straight-chain or branched propanol, straight-chain or branched butanol, straight-chain or branched pentanol, straight-chain or branched hexanol, straight-chain or branched heptanol, straight-chain or branched octanol, straight-chain or branched nonanol, straight-chain or branched decanol, straight-chain or branched undecanol, straight-chain or branched dodecanol, straight-chain or branched tridecanol, straight-chain or branched tetradecanol, straight-chain or branched pentadecanol, straight-chain or branched hexadecanol, straight-chain or branched heptadecanol, straight-chain or branched octadecanol, straight-chain or branched nonadecanol, straight-chain or branched eicosanol, straight-chain or branched heneicosanol, straight-chain or branched tricosanol, straight-chain or branched tetracosanol, and mixtures thereof.

As specific examples of dihydric alcohols composing esters (ii) there may be mentioned ethylene glycol, diethylene glycol, polyethylene glycol (3-15 mers of ethylene glycol), propylene glycol, dipropylene glycol, polypropylene glycol (3-15 mers of propylene glycol), 1,3-propanediol, 1,2-propanediol, 1,3-butanediol, 1,4-butanediol, 2-methyl-1,2-propanediol, 2-methyl-1,3-propanediol, 1,2-pentanediol, 1,3-pentanediol, 1,4-pentanediol, 1,5-pentanediol, neopentyl glycol, and mixtures thereof.

Preferred among these dihydric alcohols are ethylene glycol, diethylene glycol, polyethylene glycol (3-10 mers of ethylene glycol), propylene glycol, dipropylene glycol, polypropylene glycol (3-10 mers of propylene glycol), 1,3-propanediol, 2-methyl-1,2-propanediol, 2-methyl-1,3-propanediol, and mixtures thereof.

As monobasic acids composing esters (i) and (iii) there may usually be used C2-C24 fatty acids, and the fatty acids may be straight-chain or branched and either saturated or unsaturated. As specific examples there may be mentioned saturated fatty acids such as acetic acid, propionic acid, straight-chain or branched butanoic acid, straight-chain or branched pentanoic acid, straight-chain or branched hexanoic acid, straight-chain or branched heptanoic acid, straight-chain or branched octanoic acid, straight-chain or branched nonanoic acid, straight-chain or branched decanoic acid, straight-chain or branched undecanoic acid, straight-chain or branched dodecanoic acid, straight-chain or branched tridecanoic acid, straight-chain or branched tetradecanoic acid, straight-chain or branched pentadecanoic acid, straight-chain or branched hexadecanoic acid, straight-chain or branched heptadecanoic acid, straight-chain or branched octadecanoic acid, straight-chain or branched hydroxyoctadecanoic acid, straight-chain or branched nonadecanoic acid, straight-chain or branched eicosanoic acid, straight-chain or branched heneicosanoic acid, straight-chain or branched docosanoic acid, straight-chain or branched tricosanoic acid and straight-chain or branched tetracosanoic acid; unsaturated fatty acids such as acrylic acid, straight-chain or branched butenoic acid, straight-chain or branched pentenoic acid, straight-chain or branched hexenoic acid, straight-chain or branched heptenoic acid, straight-chain or branched octenoic acid, straight-chain or branched nonenoic acid, straight-chain or branched decenoic acid, straight-chain or branched undecenoic acid, straight-chain or branched dodecenoic acid, straight-chain or branched tridecenoic acid, straight-chain or branched tetradecenoic acid, straight-chain or branched pentadecenoic acid, straight-chain or branched hexadecenoic acid, straight-chain or branched heptadecenoic acid, straight-chain or branched octadecenoic acid, straight-chain or branched hydroxyoctadecenoic acid, straight-chain or branched nonadecenoic acid, straight-chain or branched eicosenoic acid, straight-chain or branched heneicosenoic acid, straight-chain or branched docosenoic acid, straight-chain or branched tricosenoic acid and straight-chain or branched tetracosenoic acid; and mixtures thereof Among these, from the viewpoint of obtaining more excellent lubricity for cutting and grinding, improving precision of the finishing surface of the working piece and achieving an even greater anti-abrasive effect for tool blades, particularly C3-C20 saturated fatty acids, C3-C22 unsaturated fatty acids and mixtures thereof are preferred, C4-C18 saturated fatty acids, C4-C18 unsaturated fatty acids and their mixtures are more preferred and C4-C18 unsaturated fatty acids are even more preferred, while from the viewpoint of preventing sticking, C4-C18 saturated fatty acids are especially preferred.

As dibasic acids composing the esters (iii) there may be mentioned C2-C16 dibasic acids. Such C2-C16 dibasic acids may be straight-chain or branched, and either saturated or unsaturated. As specific examples there may be mentioned ethanedioic acid, propanedioic acid, straight-chain or branched butanedioic acid, straight-chain or branched pentanedioic acid, straight-chain or branched hexanedioic acid, straight-chain or branched heptanedioic acid, straight-chain or branched octanedioic acid, straight-chain or branched nonanedioic acid, straight-chain or branched decanedioic acid, straight-chain or branched undecanedioic acid, straight-chain or branched dodecanedioic acid, straight-chain or branched tridecanedioic acid, straight-chain or branched tetradecanedioic acid, straight-chain or branched heptadecanedioic acid, straight-chain or branched hexadecanedioic acid, straight-chain or branched hexenedioic acid, straight-chain or branched heptenedioic acid, straight-chain or branched octenedioic acid, straight-chain or branched nonenedioic acid, straight-chain or branched decenedioic acid, straight-chain or branched undecenedioic acid, straight-chain or branched dodecenedioic acid, straight-chain or branched tridecenedioic acid, straight-chain or branched tetradecenedioic acid, straight-chain or branched heptadecenedioic acid, straight-chain or branched hexadecenedioic acid, and mixtures thereof.

The esters (ii) may be total esters (diesters) wherein all of the hydroxyl groups of the dihydric alcohol are esterified, or they may be partial esters (monoesters) wherein a portion of the hydroxyl groups remain as hydroxyl groups without esterification. The esters (iii) may also be total esters (diesters) wherein all of the carboxyl groups of the polybasic acid are esterified, or they may be partial esters (monoesters) wherein a portion of the carboxyl groups remain as carboxyl groups without esterification.

When an oil for metal working according to the first embodiment contains these esters (i)-(iii), the total content of the esters (i)-(iii) is preferably no greater than 70% by mass, more preferably no greater than 65% by mass, even more preferably no greater than 60% by mass and yet more preferably no greater than 55% by mass based on the total amount of the oil, from the standpoint of increasing working efficiency and extending tool life. From the viewpoint of further improving the handleability, the total content of esters (i)-(iii) is preferably at least 10% by mass, more preferably at least 20% by mass, even more preferably at least 30% by mass and yet more preferably 40% by mass based on the total amount of the oil. The oil for metal working of the first embodiment preferably contains an oiliness agent from the viewpoint of increasing working efficiency and extending tool life. As oiliness agents there may be mentioned (A) alcohols, (B) carboxylic acids, (C) unsaturated carboxylic acid sulfides, (D) compounds represented by general formula (1-1) below, (E) compounds represented by general formula (1-2) below, (F) polyoxyalkylene compounds, (G) esters, (H) polyhydric alcohol hydrocarbylethers and (I) amines.

[Chemical Formula 1]

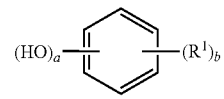

(1-1)

[wherein $R^1$ represents a C1-C30 hydrocarbon group, a represents an integer of 1-6 and b represents an integer of 0-5.]

[Chemical Formula 2]

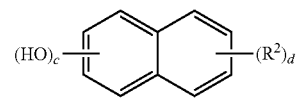

(1-2)

[wherein $R^2$ represents a C1-C30 hydrocarbon group, c represents an integer of 1-6 and d represents an integer of 0-5.]

The (A) alcohols may be monohydric alcohols or polyhydric alcohols. From the viewpoint of increasing working efficiency and extending tool life, C1-C40 monohydric alcohols are preferred, C1-C25 alcohols are more preferred and C8-C18 alcohols are most preferred. More specifically, there may be mentioned as examples the alcohols composing the esters for the aforementioned base oils. These alcohols may be straight-chain or branched and either saturated or unsaturated, but from the standpoint of preventing sticking they are preferably saturated.

The (B) carboxylic acids may be monobasic acids or polybasic acids. From the viewpoint of increasing working efficiency and extending tool life, C1-C40 monobasic carboxylic acids are preferred, C5-C25 carboxylic acids are more preferred and C5-C20 carboxylic acids are most preferred. More specifically, there may be mentioned as examples the carboxylic acids composing the esters for the aforementioned base oils. These carboxylic acids may be straight-chain or branched and either saturated or unsaturated, but from the standpoint of preventing sticking they are preferably saturated carboxylic acids.

As examples of the (C) unsaturated carboxylic acid sulfides there may be mentioned sulfides of unsaturated carboxylic acids among the (B) carboxylic acids. As specific examples there may be mentioned sulfides of oleic acid.

As examples of C1-C30 hydrocarbon groups represented by $R^1$ in the (D) compounds represented by general formula (1-1) above, there may be mentioned C1-C30 straight-chain or branched alkyl, C5-C7 cycloalkyl, C6-C30 alkylcycloalkyl, C2-C30 straight-chain or branched alkenyl, C6-C10 aryl, C7-C30 alkylaryl and C7-C30 arylalkyl. Among these, C1-C30 straight-chain or branched alkyl groups are preferred, C1-C20 straight-chain or branched alkyl groups are more preferred, C1-C10 straight-chain or branched alkyl groups are even more preferred, and C1-C4 straight-chain or branched alkyl groups are most preferred. As examples of C1-C4 straight-chain or branched alkyl groups there may be mentioned methyl, ethyl, straight-chain or branched propyl and straight-chain or branched butyl.

The hydroxyl may be substituted at any position, but in the case of two or more hydroxyl groups they are preferably substituted at adjacent carbon atoms. The symbol a is preferably an integer of 1-3 and more preferably 2. The symbol b is preferably an integer of 0-3 and more preferably 1 or 2. As an example of a compound represented by general formula (1-1) there may be mentioned p-tert-butylcatechol.

As examples of C1-C30 hydrocarbon groups represented by $R^2$ in the (E) compounds represented by general formula (1-2) above, there may be mentioned the same examples of C1-C30 hydrocarbon groups represented by $R^1$ in general formula (1-1) above, and the preferred examples are also the same. The hydroxyl may be substituted at any position, but in the case of two or more hydroxyl groups they are preferably substituted at adjacent carbon atoms. The symbol c is preferably an integer of 1-3 and more preferably 2. The symbol d is preferably an integer of 0-3 and more preferably 1 or 2. As examples of compounds represented by general formula (1-2) there may be mentioned 2,2-dihydroxynaphthalene and 2,3-dihydroxynaphthalene.

As examples of the (F) polyoxyalkylene compounds there may be mentioned compounds represented by the following general formulas (1-3) and (1-4).

$$R^3O\!-\!(R^4O)_e\!-\!R^5 \quad (1\text{-}3)$$

[wherein $R^3$ and $R^5$ each independently represent hydrogen or a C1-C30 hydrocarbon group, $R^4$ represents C2-C4 alkylene, and e represents an integer such that the number-average molecular weight is 100-3500.]

$$A\text{-}[(R^6O)_f\!-\!R^7]_g \quad (1\text{-}4)$$

[wherein A represents the residue of a polyhydric alcohol having 3-10 hydroxyl groups of which all or a portion of the hydrogens of the hydroxyl groups have been removed, $R^6$ represents C2-C4 alkylene, $R^7$ represents hydrogen or a C1-C30 hydrocarbon group, f represents an integer such that the number-average molecular weight is 100-3500, and g represents the same number as the number of hydrogens removed from the hydroxyl groups of A.]

In general formula (1-3), at least one of $R^3$ and $R^5$ is preferably hydrogen. As examples of C1-C30 hydrocarbon groups represented by $R^3$ and $R^5$ there may be mentioned the same examples of C1-C30 hydrocarbon groups represented by $R^1$ of general formula (1-1) above, and the preferred examples are also the same. As specific examples of C2-C4 alkylene groups represented by $R^4$ there may be mentioned ethylene, propylene (methylethylene) and butylene (ethylethylene). The symbol e is preferably an integer such that the number-average molecular weight is 300-2000, and more preferably an integer such that the number-average molecular weight is 500-1500.

As specific examples of polyhydric alcohols having 3-10 hydroxyl groups of A in general formula (1-4) above, there may be mentioned polyhydric alcohols such as glycerin, polyglycerin (2-4 mers of glycerin such as diglycerin, triglycerin and tetraglycerin), trimethylolalkanes (trimethylolethane, trimethylolpropane, trimethylolbutane) and their 2-4 mers, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol-glycerin condensation products, adonitol, arabitol, xylitol, mannitol, iditol, talitol, dulcitol and allitol; and sugars such as xylose, arabinose, ribose, rhamnose, glucose, fructose, galactose, mannose, sorbose, cellobiose, mantose, isomantose, trehalose and sucrose. Preferred among these are glycerin, polyglycerin, trimethylolalkanes and their 2-4 mers, pentaerythritol, dipentaerythritol, sorbitol and sorbitan.

As examples of C2-C4 alkylene groups represented by $R^6$ there may be mentioned the same examples of C2-C4 alkylene groups represented by $R^4$ in general formula (1-3) above. As examples of C1-C30 hydrocarbon groups represented by $R^7$ there may be mentioned the same examples of C1-C30 hydrocarbon groups represented by $R^1$ in general formula (1-1) above, and the preferred examples are also the same. At least one of the g number of $R^7$ groups is preferably hydrogen, and more preferably all of them are hydrogen. The symbol f is preferably an integer such that the number-average molecular weight is 300-2000, and more preferably an integer such that the number-average molecular weight is 500-1500.

The alcohols in the (G) esters may be monohydric alcohols or polyhydric alcohols, and the carboxylic acids may be monobasic acids or polybasic acids.

As examples of monohydric alcohols and polyhydric alcohols composing the esters there may be mentioned the same monohydric alcohols and polyhydric alcohols mentioned for the esters of base oils. The preferred ones are also the same. The examples of monobasic acids and polybasic acids of the esters are also the same as the monobasic acids and polybasic acids mentioned above for the esters of base oils. The preferred ones are also the same.

Any combinations of alcohols and carboxylic acids may be used with no particular restrictions, and for example, the following combinations may be mentioned.

(G-1) Esters of monohydric alcohols and monobasic acids
(G-2) Esters of polyhydric alcohols and monobasic acids
(G-3) Esters of monohydric alcohols and polybasic acids
(G-4) Esters of polyhydric alcohols and polybasic acids
(G-5) Mixed esters of monohydric alcohol and polyhydric alcohol mixtures with polybasic acids
(G-6) Mixed esters of polyhydric alcohols with monobasic acid and polybasic acid mixtures
(G-7) Mixed esters of monohydric alcohol and polyhydric alcohol mixtures with monobasic acids and polybasic acids When a polyhydric alcohol is used as the alcohol component, the ester may be a total ester wherein all of the hydroxyl groups of the polyhydric alcohol are esterified, or it may be a partial ester wherein a portion of the hydroxyl groups remain as hydroxyl groups without esterification. Also, when a polybasic acid is used as the carboxylic acid component, the ester may be a total ester wherein all of the carboxyl groups of the polybasic acid are esterified, or it may be a partial ester wherein a portion of the carboxyl groups remain as carboxyl groups without esterification.

There are no particular restrictions on the total number of carbon atoms of the ester as the oiliness agent, but from the standpoint of increasing working efficiency and extending tool life, the ester preferably has a total number of carbon atoms of 7 or greater, more preferably 9 or greater and most preferably 11 or greater. From the standpoint of minimizing staining and corrosion and of compatibility with organic materials, the ester preferably has a total number of carbon atoms of no greater than 60, more preferably no greater than 45, even more preferably no greater than 26, yet more preferably no greater than 24 and most preferably no greater than 22.

As polyhydric alcohols of (H) polyhydric alcohol hydrocarbylethers there are usually used those with 2-10 and preferably 2-6 hydroxyl groups. As specific examples of 2-10 polyhydric alcohols there may be mentioned dihydric alcohols such as ethylene glycol, diethylene glycol, polyethylene glycol (3-15 mers of ethylene glycol), propylene glycol, dipropylene glycol, polypropylene glycol (3-15 mers of propylene glycol), 1,3-propanediol, 1,2-propanediol, 1,3-butanediol, 1,4-butanediol, 2-methyl-1,2-propanediol, 2-methyl-1,3-propanediol, 1,2-pentanediol, 1,3-pentanediol, 1,4-pentanediol, 1,5-pentanediol and neopentyl glycol; polyhydric alcohols such as glycerin, polyglycerin (2-8 mers of glycerin, such as diglycerin, triglycerin, tetraglycerin and the like), trimethylolalkanes (trimethylolethane, trimethylolpropane, trimethylolbutane) and their 2-8 mers, pentaerythritol and its 2-4 mers, 1,2,4-butanetriol, 1,3,5-pentanetriol, 1,2,6-hexanetriol, 1,2,3,4-butanetetrol, sorbitol, sorbitan, sorbitol-glycerin condensation product, adonitol, arabitol, xylitol and mannitol; sugars such as xylose, arabinose, ribose, rhamnose, glucose, fructose, galactose, mannose, sorbose, cellobiose, maltose, isomaltose, trehalose and sucrose; and mixtures thereof.

Preferred among these polyhydric alcohols are 2-6 polyhydric alcohols such as ethylene glycol, diethylene glycol, polyethylene glycol (3-10 mers of ethylene glycol), propylene glycol, dipropylene glycol, polypropylene glycol (3-1 mers of propylene glycol), 1,3-propanediol, 2-methyl-1,2-propanediol, 2-methyl-1,3-propanediol, neopentyl glycol, glycerin, diglycerin, triglycerin, trimethylolalkanes (trimethylolethane, trimethylolpropane, trimethylolbutane) and their 2-4 mers, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol-glycerin condensation product, adonitol, arabitol, xylitol and mannitol, and mixtures thereof. More preferred are ethylene glycol, propylene glycol, neopentyl glycol, glycerin, trimethylolethane, trimethylolpropane, pentaerythritol, sorbitan and mixtures thereof. Among these, glycerin is most preferred from the standpoint of increasing working efficiency and extending tool life.

As (H) polyhydric alcohol hydrocarbylethers there may be used ones obtained by hydrocarbyletherification of all or a portion of the hydroxyl groups of the aforementioned polyhydric alcohols. From the standpoint of increasing working efficiency and extending tool life, there are preferred polyhydric alcohols with hydrocarbyletherification of a portion of the hydroxyl groups (partially etherified). Here, a hydrocarbyl group is a C1-C24 hydrocarbon group such as C1-C24 alkyl, C2-C24 alkenyl, C5-C7 cycloalkyl, C6-C11 alkylcycloalkyl, C6-C10 aryl, C7-C18 alkylaryl, C7-C18 arylalkyl, or the like.

As C1-C24 alkyl groups there may be mentioned methyl, ethyl, n-propyl, isopropyl, n-butyl, isobutyl, sec-butyl, tert-butyl, straight-chain or branched pentyl, straight-chain or branched hexyl, straight-chain or branched heptyl, straight-chain or branched octyl, straight-chain or branched nonyl, straight-chain or branched decyl, straight-chain or branched undecyl, straight-chain or branched dodecyl, straight-chain or branched tridecyl, straight-chain or branched tetradecyl, straight-chain or branched pentadecyl, straight-chain or branched hexadecyl, straight-chain or branched heptadecyl, straight-chain or branched octadecyl, straight-chain or branched nonadecyl, straight-chain or branched eicosyl, straight-chain or branched heneicosyl, straight-chain or branched docosyl, straight-chain or branched tricosyl and straight-chain and branched tetracosyl.

As C2-C24 alkenyl groups there may be mentioned vinyl, straight-chain or branched propenyl, straight-chain or branched butenyl, straight-chain or branched pentenyl, straight-chain or branched hexenyl, straight-chain or branched heptenyl, straight-chain or branched octenyl, straight-chain or branched nonenyl, straight-chain or branched decenyl, straight-chain or branched undecenyl, straight-chain or branched dodecenyl, straight-chain or branched tridecenyl, straight-chain or branched tetradecenyl, straight-chain or branched pentadecenyl, straight-chain or branched hexadecenyl, straight-chain or branched heptadecenyl, straight-chain or branched octadecenyl, straight-chain or branched nonadecenyl, straight-chain or branched eicosenyl, straight-chain or branched heneicosenyl, straight-chain or branched docosenyl, straight-chain or branched tricosenyl and straight-chain and branched tetracosenyl.

As C5-C7 cycloalkyl groups there may be mentioned cyclopentyl, cyclohexyl and cycloheptyl. As C6-C11 alkylcycloalkyl groups there may be mentioned methylcyclopentyl, dimethylcyclopentyl (including all structural isomers), methylethylcyclopentyl (including all structural isomers), diethylcyclopentyl (including all structural isomers), methylcyclohexyl, dimethylcyclohexyl (including all structural isomers), methylethylcyclohexyl (including all structural isomers), diethylcyclohexyl (including all structural isomers), methylcycloheptyl, dimethylcycloheptyl (including all structural isomers), methylethylcycloheptyl (including all structural isomers) and diethylcycloheptyl (including all structural isomers).

As C6-C10 aryl groups there may be mentioned phenyl and naphthyl. As C7-C18 alkylaryl groups there may be mentioned tolyl (including all structural isomers), xylyl (including all structural isomers), ethylphenyl (including all structural isomers), straight-chain or branched propylphenyl (including all structural isomers), straight-chain or branched butylphenyl (including all structural isomers), straight-chain or branched pentylphenyl (including all structural isomers), straight-chain or branched hexylphenyl (including all structural isomers), straight-chain or branched heptylphenyl (including all structural isomers), straight-chain or branched octylphenyl (including all structural isomers), straight-chain or branched nonylphenyl (including all structural isomers), straight-chain or branched decylphenyl (including all structural isomers), straight-chain or branched undecylphenyl (including all structural isomers) and straight-chain or branched dodecylphenyl (including all structural isomers).

As C7-C12 arylalkyl groups there may be mentioned benzyl, phenylethyl, phenylpropyl (including propyl isomers), phenylbutyl (including butyl isomers), phenylpentyl (including pentyl isomers) and phenylhexyl (including hexyl isomers).

Preferred among these from the standpoint of increasing working efficiency and extending tool life are C2-C18 straight-chain or branched alkyl and C2-C18 straight-chain or branched alkenyl groups, among which C3-C12 straight-chain or branched alkyl and oleyl (residue obtained by removing hydroxyl from oleyl alcohol) are more preferred.

A monoamine is preferred for use as the (I) amine. The number of carbon atoms of the monoamine is preferably 6-24 and more preferably 12-24. Here, the number of carbon atoms is the number of carbon atoms of the monoamine, and when the monoamine has two or more hydrocarbon groups it is the total number of carbon atoms.

Monoamines to be used for the invention include primary monoamines, secondary monoamines and tertiary monoamines, although primary monoamines are preferred from the standpoint of increasing working efficiency and extending tool life.

As hydrocarbon groups bonded to the nitrogen atom of the monoamine there may be used alkyl, alkenyl, cycloalkyl, alkylcycloalkyl, aryl, alkylaryl, arylalkyl and the like, although alkyl and alkenyl groups are preferred from the standpoint of increasing working efficiency and extending tool life. The alkyl and alkenyl groups may be straight-chain or branched, but are preferably straight-chain from the standpoint of increasing working efficiency and extending tool life.

As specific examples of preferred monoamines to be used for the invention there may be mentioned hexylamine (including all isomers), heptylamine (including all isomers), octylamine (including all isomers), nonylamine (including all isomers), decylamine (including all isomers), undecylamine (including all isomers), dodecylamine (including all isomers), tridecylamine (including all isomers), tetradecylamine (including all isomers), pentadecylamine (including all isomers), hexadecylamine (including all isomers), heptadecylamine (including all isomers), octadecylamine (including all isomers), nonadecylamine (including all isomers), eicosylamine (including all isomers), heneicosylamine (including all isomers), docosylamine (including all isomers), tricosylamine (including all isomers), tetracosylamine (including all isomers), octadecenylamine (including all isomers) (including oleylamine, etc.), and mixtures of two or more thereof. Among these, C12-C24 primary monoamines are preferred, C14-20 primary monoamines are more preferred and C16-18 primary monoamines are even more preferred, from the standpoint of increasing working efficiency and extending tool life.

According to the invention, one selected from among the aforementioned oiliness agents (A) to (H) may be used, or a mixture of two or more thereof may be used. Of these, one or a mixture of two or more selected from among (B) carboxylic acids and (H) amines are preferred because of their superior lubricity.

There are no particular restrictions on the content of the oiliness agent, but from the standpoint of increasing working efficiency and extending tool life, it is preferably at least 0.01% by mass, more preferably at least 0.05% by mass and even more preferably at least 0.1% by mass based on the total amount of the oil. From the standpoint of stability, the oiliness agent content is preferably no greater than 15% by mass, more preferably no greater than 10% by mass and even more preferably no greater than 5% by mass based on the total amount of the lubricating oil.

A lubricating oil for machine tools according to the invention preferably further contains an extreme pressure agent. As preferred extreme pressure agents there may be mentioned the sulfur compounds and phosphorus compounds mentioned below.

There are no particular restrictions on sulfur compounds to be used for the invention so long as the properties as an oil for metal working are not impaired, but preferred for use are dihydrocarbyl polysulfides, sulfidized esters, sulfidized mineral oils, zinc dithiophosphate compounds, zinc dithiocarbaminate compounds molybdenum dithiophosphate compounds and molybdenum thiocarbaminate.

Dihydrocarbyl polysulfides are sulfuir-based compounds generally known as polysulfides or sulfidized olefins, and specifically refer to compounds represented by the following general formula (1-5):

$$R^8—S_h—R^9 \quad (1\text{-}5)$$

[wherein $R^8$ and $R^9$ are the same or different and each represents C3-C20 straight-chain or branched alkyl, C6-C20 aryl, C6-C20 alkylaryl or C6-C20 arylalkyl, and h represents an integer of 2-6 and preferably 2-5.]

As specific examples of $R^8$ and $R^9$ in general formula (1-5) above there may be mentioned straight-chain or branched alkyl groups such as n-propyl, isopropyl, n-butyl, isobutyl, sec-butyl, tert-butyl, straight-chain or branched pentyl, straight-chain or branched hexyl, straight-chain or branched heptyl, straight-chain or branched octyl, straight-chain or branched nonyl, straight-chain or branched decyl, straight-chain or branched undecyl, straight-chain or branched dodecyl, straight-chain or branched tridecyl, straight-chain or branched tetradecyl, straight-chain or branched pentadecyl, straight-chain or branched hexadecyl, straight-chain or branched heptadecyl, straight-chain or branched octadecyl, straight-chain or branched nonadecyl and straight-chain or branched eicosyl; aryl groups such as phenyl and naphthyl; alkylaryl groups such as tolyl (including all structural isomers), ethylphenyl (including all structural isomers), straight-chain or branched propylphenyl (including all structural isomers), straight-chain or branched butylphenyl (including all structural isomers), straight-chain or branched pentylphenyl (including all structural isomers), straight-chain or branched hexylphenyl (including all structural isomers), straight-chain or branched heptylphenyl (including all structural isomers), straight-chain or branched octylphenyl (including all structural isomers), straight-chain or branched nonylphenyl (including all structural isomers), straight-chain or branched decylphenyl (including all structural isomers), straight-chain or branched undecylphenyl (including all structural isomers), straight-chain or branched dodecylphenyl (including all structural isomers), xylyl (including all structural isomers), ethylmethylphenyl (including all structural isomers), diethylphenyl (including all structural isomers), di(straight-chain or branched)propylphenyl (including all structural isomers), di(straight-chain or branched)butylphenyl (including all structural isomers), methylnaphthyl (including all structural isomers), ethylnaphthyl (including all structural isomers), straight-chain or branched propylnaphthyl (including all structural isomers), straight-chain or branched butylnaphthyl (including all structural isomers), dimethylnaphthyl (including all structural isomers), ethylmethylnaphthyl (including all structural isomers), diethylnaphthyl (including all structural isomers), di(straight-chain or branched)propylnaphthyl (including all structural isomers) and di(straight-chain or branched)butylnaphthyl (including all structural isomers); and arylalkyl groups such as benzyl, phenylethyl (including all isomers) and phenylpropyl (including all isomers). Among these there are preferred compounds wherein $R^8$ and $R^9$ of general formula (1-5) are C3-C18 alkyl groups derived from propylene, 1-butene or isobutylene, or C6-C8 aryl and alkylaryl groups, and as examples of such groups there may be mentioned alkyl groups such as isopropyl, propylene dimer-derived branched hexyl (including all branched isomers), propylene trimer-derived branched nonyl (including all branched isomers), propylene tetramer-derived branched dodecyl (including all branched isomers), propylene pentamer-derived branched pentadecyl (including all branched isomers), propylene hexamer-derived branched octadecyl (including all branched isomers), sec-butyl, tert-butyl, 1-butene dimer-derived branched octyl (including all branched isomers), isobutylene dimer-derived branched octyl (including all branched isomers), 1-butene trimer-derived branched dodecyl (including all branched isomers), isobutylene trimer-derived branched dodecyl (including all branched isomers), 1-butene tetramer-derived branched hexadecyl (including all branched isomers) and isobutylene tetramer-derived branched hexadecyl (including all branched isomers); alkylaryl groups such as phenyl, tolyl (including all structural isomers), ethylphenyl (including all structural isomers) and xylyl (including all structural isomers); and arylalkyl groups such as benzyl and phenylethyl (including all isomers).

More preferred as $R^8$ and $R^9$ of general formula (1-5) above from the standpoint of increasing working efficiency and extending tool life are, independently, C3-C18 branched alkyl groups derived from ethylene or propylene, with C6-C15 branched alkyl groups derived from ethylene or propylene being particularly preferred.

As specific examples of sulfidized esters there may be mentioned esters obtained by using desired methods for sulfidization of animal and vegetable oils such as beef tallow, lard, fish oil, rapeseed oil and soybean oil; unsaturated fatty acid esters obtained by reacting unsaturated fatty acids (including oleic acid, linoleic acid and fatty acids extracted from the aforementioned animal and vegetable oils) with various alcohols; and mixtures thereof.

Sulfidized mineral oils are obtained by dissolving elemental sulfur in mineral oils. The mineral oils used for sulfidized mineral oils according to the invention are not particularly restricted, and specifically there may be mentioned paraffin-based mineral oils or naphthene-based mineral oils which are lube-oil distillates obtained by atmospheric distillation and vacuum distillation of crude oil, with refinement by appropriate combinations of refining treatments such as solvent deasphalting, solvent extraction, hydrocracking, solvent dewaxing, catalytic dewaxing, hydrogenation refining, sulfuric acid cleaning and clay treatment. Elemental sulfur may be used in any of various forms such as bulk, powder or molten liquid forms, but using elemental sulfur in powder or molten liquid form is preferred as it allows efficient dissolution in the base oil. Molten liquid elemental sulfur permits mixture of liquids and is therefore advantageous by notably shortening the time required for dissolution, but it must be handled at above the melting point of elemental sulfur and therefore necessitates special heating equipment and the like, and therefore is not always easy to manage given the risk associated with handling in high-temperature environments. In contrast, elemental sulfur powder is inexpensive and easy to manage while its dissolution time is sufficiently short, and it is therefore particularly preferred. There are no particular restrictions on the sulfur content of the sulfidized mineral oil for the invention, but normally it is preferably 0.05-1.0% by mass and more preferably 0.1-0.5% by mass based on the total amount of the sulfidized mineral oil.

Zinc dithiophosphate compounds, zinc dithiocarbaminate compounds, molybdenum dithiophosphate compounds and molybdenum dithiocarbaminate compounds are compounds represented by the following general formulas (1-6) to (1-9):

[Chemical Formula 3]

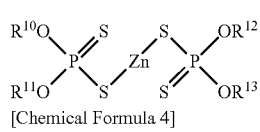

(1-6)

[Chemical Formula 4]

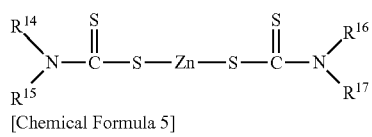

(1-7)

[Chemical Formula 5]

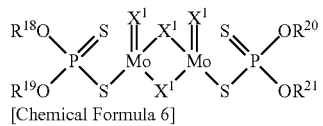

(1-8)

[Chemical Formula 6]

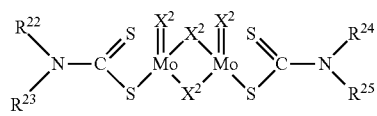

(1-9)

[wherein $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ may be the same or different and each represents a C1 or greater hydrocarbon group, and $X^1$ and $X^2$ each represents oxygen or sulfur].

As specific examples of hydrocarbon groups represented by $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ there may be mentioned alkyl groups such as methyl, ethyl, propyl (including all branched isomers), butyl (including all branched isomers), pentyl (including all branched isomers), hexyl (including all branched isomers), heptyl (including all branched isomers), octyl (including all branched isomers), nonyl (including all branched isomers), decyl (including all branched isomers), undecyl (including all branched isomers), dodecyl (including all branched isomers), tridecyl (including all branched isomers), tetradecyl (including all branched isomers), pentadecyl (including all branched isomers), hexadecyl (including all branched isomers), heptadecyl (including all branched isomers), octadecyl (including all branched isomers), nonadecyl (including all branched isomers), eicosyl (including all branched isomers), heneicosyl (including all branched isomers), docosyl (including all branched isomers), tricosyl (including all branched isomers) and tetracosyl (including all branched isomers); cycloalkyl groups such as cyclopentyl, cyclohexyl and cycloheptyl; alkylcycloalkyl groups such as methylcyclopentyl (including all substituted isomers), ethylcyclopentyl (including all substituted isomers), dimethylcyclopentyl (including all substituted isomers), propylcyclopentyl (including all branched isomers and substituted isomers), methylethylcyclopentyl (including all substituted isomers), trimethylcyclopentyl (including all substituted isomers), butylcyclopentyl (including all branched isomers and substituted isomers), methylpropylcyclopentyl (including all branched isomers and substituted isomers), diethylcyclopentyl (including all substituted isomers), dimethylethylcyclopentyl (including all substituted isomers), methylcyclohexyl (including all substituted isomers), ethylcyclohexyl (including all substituted isomers), dimethylcyclohexyl (including all substituted isomers), propylcyclohexyl (including all branched isomers and substituted isomers), methylethylcyclohexyl (including all substituted isomers), trimethylcyclohexyl (including all substituted isomers), butylcyclohexyl (including all branched isomers and substituted isomers), methylpropylcyclohexyl (including all branched isomers and substituted isomers), diethylcyclohexyl (including all substituted isomers), dimethylethylcyclohexyl (including all substituted isomers), methylcycloheptyl (including all substituted isomers), ethylcycloheptyl (including all substituted isomers), dimethylcycloheptyl (including all substituted isomers), propylcycloheptyl (including all branched isomers and substituted isomers), methylethylcycloheptyl (including all substituted isomers), trimethylcycloheptyl (including all substituted isomers), butylcycloheptyl (including all branched isomers and substituted isomers), methylpropylcycloheptyl (including all branched isomers and substituted isomers), diethylcycloheptyl (including all substituted isomers) and dimethylethylcycloheptyl (including all substituted isomers); aryl groups such as phenyl and naphthyl; alkylaryl groups such as tolyl (including all substituted isomers), xylyl (including all substituted isomers), ethylphenyl (including all substituted isomers), propylphenyl (including all branched isomers and substituted isomers), methylethylphenyl (including all substituted isomers), trimethylphenyl (including all substituted isomers), butylphenyl (including all branched isomers and substituted isomers), methylpropylphenyl (including all branched isomers and substituted isomers), diethylphenyl (including all substituted isomers), dimethylethylphenyl (including all substituted isomers), pentylphenyl (including all branched isomers and substituted isomers), hexylphenyl (including all branched isomers and substituted isomers), heptylphenyl (including all branched isomers and substituted isomers), octylphenyl (including all branched isomers and substituted isomers), nonylphenyl (including all branched isomers and substituted isomers), decylphenyl (including all branched isomers and substituted isomers), undecylphenyl (including all branched isomers and substituted isomers), dodecylphenyl (including all branched isomers and substituted isomers), tridecylphenyl (including all branched isomers and substituted isomers), tetradecylphenyl (including all branched isomers and substituted isomers), pentadecylphenyl (including all branched isomers and substituted isomers), hexadecylphenyl (including all branched isomers and substituted isomers), heptadecylphenyl (including all branched isomers and substituted isomers) and octadecylphenyl (including all branched isomers and substituted isomers); and arylalkyl groups such as benzyl, phenethyl, phenylpropyl (including all branched isomers) and phenylbutyl (including all branched isomers).

According to the invention, using at least one of the aforementioned sulfur compounds selected from the group consisting of dihydrocarbyl polysulfides and sulfidized esters is preferred in order to achieve an even better balance between increased working efficiency and extended tool life.

The sulfur compound content may be as desired, but from the standpoint of increasing working efficiency and extending tool life, it is preferably 0.01% by mass or greater, more preferably 0.05% by mass or greater and even more preferably 0.1% by mass or greater, based on the total amount of the oil. From the viewpoint of preventing abnormal wear, the sulfur compound content is preferably no greater than 50% by mass, more preferably no greater than 40% by mass, even more preferably no greater than 30% by mass and most preferably no greater than 20% by mass based on the total amount of the oil.

As specific examples of phosphorus compounds according to the invention there may be mentioned phosphoric acid esters, acidic phosphoric acid esters, acidic phosphoric acid ester amine salts, chlorinated phosphoric acid esters, phosphorous acid esters and phosphorothionates. These phosphorus compounds may be esters of phosphoric acid, phosphorous acid or thiophosphoric acid with alkanols or polyether alcohols, or they may be derivatives thereof More specifically, as phosphoric acid esters there may be mentioned tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate and xylenyldiphenyl phosphate;

as acidic phosphoric acid esters there may be mentioned monobutyl acid phosphate, monopentyl acid phosphate, monohexyl acid phosphate, monoheptyl acid phosphate, monooctyl acid phosphate, mononoyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate;

as acidic phosphoric acid ester amine salts there may be mentioned salts of amines such as methylamines, ethylamines, propylamines, butylamines, pentylamines, hexylamines, heptylamines, octylamines, dimethylamines, diethylamines, dipropylamines, dibutylamines, dipentylamines, dihexylamines, diheptylamines, dioctylamines, trimethylamines, triethylamines, tripropylamines, tributylamines, tripentylamines, trihexylamines, triheptylamine and trioctylamines, with the aforementioned acidic phosphoric acid esters;

as chlorinated phosphoric acid esters there may be mentioned tris-dichloropropyl phosphate, tris-chloroethyl phosphate, tris-chlorophenyl phosphate and polyoxyalkylene-bis[di(chloroalkyl)] phosphate;

as phosphorous acid esters there may be mentioned dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite and tricresyl phosphite;

and as phosphorothionates there may be mentioned tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate, xylenyldiphenyl phosphorothionate, tris(n-propylphenyl) phosphorothionate, tris(isopropylphenyl) phosphorothionate, tris(n-butylphenyl) phosphorothionate, tris(isobutylphenyl) phosphorothionate, tris(s-butylphenyl) phosphorothionate and tris(t-butylphenyl) phosphorothionate.

Also, two or more of these may be used in admixture.

Preferred among these phosphorus compounds according to the invention are phosphoric acid esters, acidic phosphoric acid esters and acidic phosphoric acid ester amine salts, from the standpoint of increasing working efficiency and extending tool life.

The oil for metal working according to the first embodiment may be suitably used as an oil for lubrication of sliding locations other than the machine tool used for metal working, as described hereunder, but when the oil of the invention is used as a sliding surface oil, an acidic phosphoric acid ester or acidic phosphoric acid ester amine salt is preferred. Also, when the oil of the invention is used as a hydraulic oil, a phosphoric acid ester is preferred. When it is used as both a sliding surface oil and a hydraulic oil, it is preferred to employ a combination of a phosphoric acid ester with at least one selected from among acidic phosphoric acid esters and acidic phosphoric acid ester amine salts.

The oil for metal working according to the first embodiment may contain either a sulfur compound or a phosphorus compound, or it may contain both a sulfur compound and a phosphorus compound. For further increased lubricity, however, it preferably contains a phosphorus compound or both a sulfur compound and a phosphorus compound, and more preferably it contains both a sulfur compound and a phosphorus compound.

The phosphorus compound content may be as desired, but from the standpoint of increasing working efficiency and extending tool life, it is preferably 0.005% by mass or greater, more preferably 0.01% by mass or greater and even more preferably 0.05% by mass or greater, based on the total amount of the oil. From the standpoint of preventing abnormal wear, the phosphorus compound content is preferably no greater than 15% by mass, more preferably no greater than 10% by mass, and even more preferably no greater than 5% by mass based on the total amount of the oil.

According to the invention, the aforementioned oiliness agent or extreme pressure agent may be used alone, but preferably the oiliness agent and extreme pressure agent are used in combination from the viewpoint of achieving even higher lubricity.

As antioxidants to be used there may be mentioned phenol-based antioxidants, amine-based antioxidants, zinc dithiophosphate-based antioxidants, and antioxidants used as food additives.

As phenol-based antioxidants there may be used any phenol-based compounds that are employed as antioxidants for lubricating oils, with no particular restrictions, and as preferred examples there may be mentioned one or more alkylphenol compounds selected from among compounds represented by the following general formulas (1-10) and (1-11).

[Chemical Formula 7]

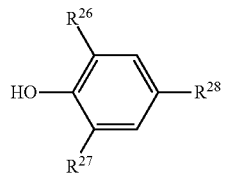

(1-10)

[wherein $R^{26}$ represents C1-C4 alkyl, $R^{27}$ represents hydrogen or C1-C4 alkyl, and $R^{28}$ represents hydrogen, C1-C4 alkyl or a group represented by the following general formula (i) or (ii):

[Chemical Formula 8]

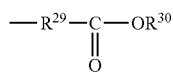

(i)

(wherein $R^{29}$ represents C1-C6 alkylene and $R^{30}$ represents C1-C24 alkyl or alkenyl),

[Chemical Formula 9]

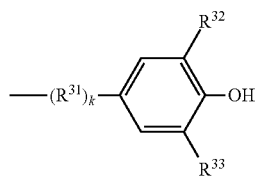

(ii)

(wherein $R^{31}$ represents C1-C6 alkylene, $R^{32}$ represents C1-C4 alkyl, $R^{33}$ represents hydrogen or C1-C4 alkyl, and k represents 0 or 1)].

[Chemical Formula 10]

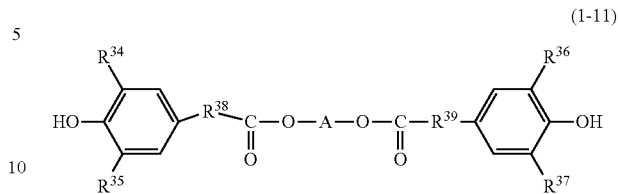

(1-11)

[wherein $R^{34}$ and $R^{36}$ are the same or different and each represents C1-C4 alkyl, $R^{35}$ and $R^{37}$ are the same or different and each represents hydrogen or C1-C4 alkyl, $R^{38}$ and $R^{39}$ are the same or different and each represents C1-C6 alkylene, and A represents C1-C18 alkylene or a group represented by the following general formula (iii):

(iii)

(wherein $R^{40}$ and $R^{41}$ are the same or different and each represents C1-C6 alkylene)].

As amine-based antioxidants for the invention there may be used any amine-based compounds that are employed as antioxidants for lubricating oils, with no particular restrictions, and as preferred examples there may be mentioned one or more aromatic amines selected from among phenyl-α-naphthylamine or N-p-alkylphenyl-α-naphthylamines represented by the following general formula (1-12), and p,p'-dialkyldiphenylamines represented by the following general formula (1-13).

[Chemical Formula 11]

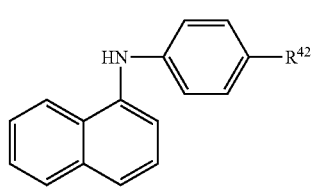

(1-12)

[wherein $R^{42}$ represents hydrogen or an alkyl group]

[Chemical Formula 12]

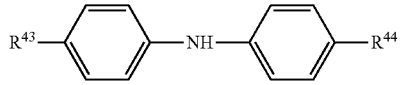

(1-13)

[wherein $R^{43}$ and $R^{44}$ are the same or different and each represents an alkyl group].

As specific examples of amine-based antioxidants there may be mentioned 4-butyl-4'-octyldiphenylamine, phenyl-α-naphthylamine, octylphenyl-α-naphthylamine, dodecylphenyl-α-naphthylamine, and mixtures thereof As zinc dithiophosphate-based antioxidants to be used for the invention there may be mentioned, specifically, zinc dithiophosphates represented by the following general formula (1-14).

[Chemical Formula 13]

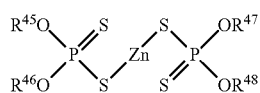

(1-14)

[wherein $R^{45}$, $R^{46}$, $R^{47}$ and $R^{48}$ are the same or different and each represents a hydrocarbon group].

Antioxidants employed as food additives may also be used, although these partially overlap with the aforementioned phenol-based antioxidants, and there may be mentioned as examples 2,6-di-tert-butyl-p-cresol (DBPC), 4,4'-methylenebis(2,6-di-tert-butylphenol), 4,4'-bis(2,6-di-tert-butylphenol), 4,4'-thiobis(6-tert-butyl-o-cresol), ascorbic acid (vitamin C), ascorbic acid fatty acid esters, tocopherol (vitamin E), 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediol (TBHQ) and 2,4,5-trihydroxybutyrophenone (THBP).

Preferred among these antioxidants are phenol-based antioxidants, amine-based antioxidants and antioxidants that are employed as food additives. The use of food additive antioxidants is especially preferred when biodegradability is a primary concern, and of these, ascorbic acid (vitamin C), ascorbic acid fatty acid esters, tocopherol (vitamin E), 2,6-di-tert-butyl-p-cresol (DBPC), 3,5-di-tert-butyl-4-bydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediol (TBHQ) and 2,4,5-trihydroxybutyrophenone (THBP) are preferred, among which ascorbic acid (vitamin C), ascorbic acid fatty acid esters, tocopherol (vitamin E), 2,6-di-tert-butyl-p-cresol (DBPC) and 3,5-di-tert-butyl-4-hydroxyanisole are especially preferred.

There are no particular restrictions on the antioxidant content, but for maintenance of satisfactory oxidation stability the content is preferably 0.01% by mass or greater, more preferably 0.05% by mass or greater and most preferably 0.1% by mass or greater based on the total amount of the oil. Since no corresponding effect can be expected with larger amounts of addition, the content is preferably no greater than 10% by mass, more preferably no greater than 5% by mass and most preferably no greater than 3% by mass.

The oil for metal working according to the first embodiment may also contain conventional publicly known additives in addition to the above. As examples of such additives there may be mentioned extreme pressure additives (including chlorine-based extreme pressure agents) other than the aforementioned phosphorus compounds and sulfur compounds; moistening agents such as diethyleneglycol monoalkylethers; film-forming agents such as acryl polymers, paraffin wax, microwax, slack wax and polyolefin wax; water displacement agents such as fatty acid amine salts; solid lubricants such as graphite, fluorinated graphite, molybdenum disulfide, boron nitride and polyethylene powder; corrosion inhibitors such as amines, alkanolamines, amides, carboxylic acids, carboxylic acid salts, sulfonic acid salts, phosphoric acid, phosphoric acid salts and polyhydric alcohol partial esters; metal inactivating agents such as benzotriazole and thiadiazole; defoaming agents such as methylsilicone, fluorosilicone and polyacrylate; and non-ash powders such as alkenylsuccinimides, benzylamine and polyalkenylamineaminoamide. The contents of such publicly known additives when used in combination are not particularly restricted, but they are generally added in amounts so that the total content of the publicly known additives is 0.1-10% by mass based on the total composition weight.

The dynamic viscosity of the oil for metal working of the first embodiment is not particularly restricted, but from the viewpoint of facilitating feeding of the oil to machining sites, the dynamic viscosity at 40° C. is preferably no greater than 200 $mm^2$/s, more preferably no greater than 100 $mm^2$/s, even more preferably no greater than 75 $mm^2$/s and most preferably no greater than 50 $mm^2$/s. Also, from the standpoint of increasing working efficiency and extending tool life, the dynamic viscosity at 40° C. is preferably at least 1 $mm^2$/s, more preferably at least 3 $mm^2$/s and even more preferably at least 5 $mm^2$/s.

The oil for metal working of the first embodiment having the construction described above may be suitably used for metal working including cutting, grinding, roll forming, forging, pressing, punching, rolling and the like. Increased improvement in properties of oils for metal working are desired in these metal working fields from the viewpoint of working efficiency, tool life and handleability, and the oil for metal working according to the first embodiment can achieve a superior balance between all of these properties. Among these uses, the oil for metal working according to the first embodiment is highly useful as an oil for use in cutting, grinding and roll forming.

There are no particular restrictions on the feeding system for feeding of the oil for metal working according to the first embodiment to working sections, but a minimal quantity lubricant system is preferred, and the oil is most preferably an oil for cutting/grinding with a minimal quantity lubricant system, in order to exhibit a more notable effect. For cutting/grinding using a minimal quantity lubricant system, it is possible to obtain a working piece with a satisfactory surface even with a minimal quantity of oil supply, while wear of the tool, etc. is also preferably minimal and cutting/grinding is preferably carried out in an efficient manner; hence, high performance is demanded of oils for cutting and grinding. Moreover, an oil with excellent biodegradability is also preferred from the viewpoint of waste treatment and operating environment. Since the oil is fed as an oil mist in a minimal quantity lubricant system, this can result in adhesion to the machine tool interior, workpiece, tool, mist collector interior, etc. producing a sticking phenomenon, and can thereby impair the handleability and lower working efficiency. Consequently, the oil used for a minimal quantity lubricant system is preferably one that is resistant to sticking. With the oil for metal working of the first embodiment, it is possible to achieve a high level of all of the aforementioned properties demanded of oils for minimal quantity lubricant systems.

Furthermore, the oil for metal working of the first embodiment can also be used as a lubricating oil for bearing sections, hydraulic equipment and gear sections, and therefore a single oil may be used as a general purpose oil for lubrication of each of these sections.

Lubrication methods such as oil bearing lubrication and mist bearing lubrication are employed for lubrication of bearing sections, but an oil composition according to the invention can be used for either type of method.

Oil bearing lubrication employs a lubricating system wherein a lubricating oil is supplied directly as a liquid to the bearing sections for smooth sliding of the sections, and the bearing sections are also cooled by the lubricating oil. Such lubricating oils for bearing lubrication must have high lubricity (wear resistance, seizing resistance, etc.) for sliding bearing sections, and because they are used at high-temperature sections, they must be resistant to thermal degradation, i.e.

highly heat resistant; the oil composition of the invention can also be used for such oil bearing lubrication.

Mist bearing lubrication employs a lubricating system wherein the lubricating oil is atomized with a mist generator and the atomized oil is supplied to the bearing sections with a gas such as air to achieve smooth sliding of the sections, and since a cooling effect is provided by the air at the high-temperature sections such as bearing sections, this type of lubricating system is becoming more commonly used in recent years for machine tools. Such lubricating oils for mist lubrication must have high lubricity (wear resistance, seizing resistance, etc.) for sliding bearing sections, and because they are used at high-temperature sections, they must be resistant to thermal degradation, i.e. highly heat resistant; the oil for metal working according to the first embodiment can also be used for such mist bearing lubrication.

Hydraulic equipment accomplishes manipulation and control of machines by oil pressure, and hydraulic oil with a lubricating, sealing and cooling effect is used in hydraulic control sections that govern machine operation. Hydraulic oil is used by compressing lubricating oil at high pressure with a pump to produce oil pressure and move equipment, and therefore the lubricating oil must have high lubricity (wear resistance, seizing resistance, etc.) and high oxidation stability and thermal stability; the oil for metal working according to the first embodiment can also be used as hydraulic oil. When the oil for metal working of the first embodiment is used as a general purpose hydraulic oil, it preferably contains the aforementioned phosphorus compounds and/or sulfur compounds for further improved lubricity.

A gear section is a section that mainly accomplishes driving with a gear provided on a gear planer or the like, and gear oil is used for smooth sliding of the section for reduced metal-metal contact. Because a high load is applied onto the gear sliding surface, the gear oil must have good lubrication properties including high wear resistance and high seizing resistance. The oil for metal working of the first embodiment can also be used as such a gear oil, and when used as a general purpose gear oil it preferably contains the aforementioned phosphorus compounds and/or sulfur compounds.

A cutting/grinding method with a minimal quantity lubricant system using an oil for metal working according to the first embodiment will now be explained.

FIG. 1 is a schematic diagram showing an example of a machine tool suitable for use in a cutting/grinding method with a minimal quantity lubricant system according to the present invention. The machine tool shown in FIG. 1 comprises a table 2 which is movable in the direction of the arrow on a bed 1, and a tool 11 which is supported on support means 10 and is rotatable in the direction of the arrow. An oil according to the invention is housed in an oil feeding tank 12, and during cutting/grinding of a workpiece 3 placed on the table 2, compressed air fed from a compressed air injection port 18 is supplied, together with the oil of the invention in mist form, from the working oil feeding section 13 toward the working site. The oil of the invention housed in the oil feeding tank 12 is supplied from the sliding surface oil feeding section 14 to the sliding surface 16 between the bed 1 and the table 2, while also being supplied from the bearing oil feeding section 15 to the bearing section between the support means 10 and tool 11, for lubrication of the sliding surface 16 and the bearing section 17.

Thus, in this cutting/grinding method with a minimal quantity lubricant system, an oil comprising the same triester is used for lubrication of the sliding surfaces of the cutting and grinding sites and the machine tool, as well as for the bearing sections, thereby achieving improved working performance and operating efficiency for a cutting/grinding method with a minimal quantity lubricant system.

Preferably, the same oil is used as the cutting/grinding oil and the sliding surface oil or further as the bearing oil in this cutting/grinding method with a minimal quantity lubricant system, as shown in FIG. 1, in order to eliminate the need for providing separate oil feeding tanks for supply of each oil, and thereby allow savings in space and energy for the machine tool.

Incidentally, while not shown in FIG. 1, the oil of the invention housed in the oil feeding tank 12 may be supplied to hydraulic equipment provided with the machine tool for use of the oil of the invention as a hydraulic oil in the cutting/grinding method with a minimal quantity lubricant system according to the invention. Also, the oil of the invention housed in the oil feeding tank 12 may be supplied to a gear section provided with the machine tool for use of the oil of the invention as a gear oil.

The oil for metal working according to a second embodiment of the invention is an oil for metal working comprising a hydrocarbon oil and a triester of fatty acids and glycerin, wherein the triester content is 1-50% by mass based on the total composition weight and the content of oleic acid in the fatty acids is 40-98% by mass based on the total amount of the fatty acids.

The hydrocarbon oil in the oil for metal working according to the second embodiment may be a mineral oil or a synthetic oil, or it may be a mixture thereof.

As examples of mineral oils to be used for the invention there may be mentioned paraffin-based mineral oils or naphthene-based mineral oils which are lube-oil distillates obtained by atmospheric distillation and vacuum distillation of crude oil, with refinement by appropriate combinations of refining treatments such as solvent deasphalting, solvent extraction, hydrocracking, solvent dewaxing, catalytic dewaxing, hydrogenation refining, sulfuric acid cleaning and clay treatment.

As synthetic oils to be used for the invention there may be mentioned, specifically, poly α-olefins such as propylene oligomer, polybutene, polyisobutylene, 1-octene oligomer, 1-decene oligomer, ethylene and propylene co-oligomer, ethylene and 1-octene co-oligomer, ethylene and 1-decene co-oligomer, or their hydrogenated products; isoparaffin; alkylbenzenes such as monoalkylbenzenes, dialkylbenzenes and polyalkylbenzenes; and alkylnaphthalenes such as monoalkylnaphthalenes, dialkylnaphthalenes and polyalkylnaphthalenes, and these may be used alone or in combinations of two or more.

The content of a hydrocarbon oil according to the invention may be as desired, but it is preferably 20-99% by mass, more preferably 30-95% by mass and even more preferably 40-90% by mass based on the total composition weight.

The oil for metal working according to the second embodiment includes a triester of fatty acids and glycerin (hereinafter referred to simply as "triester"), with 40-98% by mass of the fatty acid consisting of oleic acid. By using such a triester it is possible to achieve a superior balance between increase in working efficiency, lengthening of tool life and handleability. From the viewpoint of achieving a superior balance between increase in working efficiency, lengthening of tool life and handleability, the oleic acid content in the fatty acids composing the triester is preferably at least 50% by mass, more preferably at least 60% by mass and even more preferably at least 70% by mass. For the same reason, the content is preferably no greater than 95% by mass and more preferably no greater than 90% by mass.

The contents of oleic acid, and of linoleic acid, etc. described hereunder in the fatty acid of the triester according to the invention (hereinafter referred to as "constituent fatty acid") are measured in a manner based on the Standard Fat and Oil Analysis Methods 2.4.2, "Fatty Acid Composition", established by the Japan Oil Chemists' Society.

The fatty acids other than oleic acid of the constituent fatty acid of the triester of the invention are not particularly restricted so long as the working efficiency, tool life and handleability are not impaired, but C6-C24 fatty acids are preferred. The C6-C24 fatty acids may be saturated fatty acids, or they may be unsaturated fatty acids with 1-5 unsaturated bonds. The fatty acids may also be either straight-chain or branched. They may also contain 1-3 hydroxyl groups (—OH) in the molecule in addition to carboxyl groups (—COOH). As such fatty acids there may be mentioned, specifically, caproic acid, caprylic acid, capric acid, lauric acid, myristic acid, palmitic acid, stearic acid, arachidic acid, behenic acid, lignoceric acid, lauroleic acid, myristoleic acid, palmitoleic acid, gadoleic acid, erudic acid, ricinolic acid, linoleic acid, linolenic acid, oleostearic acid, licanic acid, arachidonic acid and clupanodoic acid. Linoleic acid is preferred among these fatty acids from the viewpoint of achieving a superior balance between working efficiency, tool life and handleability, and more preferably linoleic acid constitutes 1-60% by mass (more preferably 2-50% by mass, and even more preferably 4-40% by mass) of the constituent fatty acids of the triester.

Also from the viewpoint of achieving a superior balance between working efficiency, tool life and handleability, C6-C16 fatty acids preferably constitute 0.1-30% by mass (more preferably 0.5-20% by mass and even more preferably 1-10% by mass) of the constituent fatty acids in the triester of the invention.

The total degree of unsaturation of the triester is preferably no greater than 0.3, and more preferably no greater than 0.2. If the total degree of unsaturation of the triester is greater than 0.3, the handleability of the oil for metal working of the invention will tend to be impaired. The total degree of unsaturation according to the invention is the total degree of unsaturation measured according to the "Testing method of polyether for polyurethane" (JIS K1557-1970), using the same apparatus and procedure, except that a triester was used instead of a polyether for polyurethane.

The triester of the invention may be a synthetically obtained triester or a triester-containing natural oil such as a vegetable oil, so long as the content of oleic acid of the constituent fatty acid satisfies the conditions specified above. From the standpoint of human safety, however, it is preferred to use a natural oil such as a vegetable oil. Preferred vegetable oils include rapeseed oil, sunflower oil, soybean oil, corn oil and canola oil, among which sunflower oil and rapeseed oil are particularly preferred.

Although most natural vegetable oils have a total degree of unsaturation exceeding 0.3, their total degree of unsaturation can be reduced by treatment such as hydrogenation in a refining step. In addition, vegetable oils with low total degrees of unsaturation can be easily produced by cross-breeding and gene recombinant techniques. Examples include high-oleic-acid canola oil with a degree of unsaturation of no greater than 0.3 and an oleic acid content of 70% by mass or greater, and high-oleic-acid rapeseed oil, high-oleic-acid sunflower oil and high-oleic-acid soybean oil having contents of 80% by mass and greater.

In order to further increase the working efficiency and tool life with the oil for metal working according to the second embodiment, preferably the hydroxyl value of the triester is 0.01-300 mgKOH/g and the saponification value is 100-500 mgKOH/g. In order to obtain even further increased working efficiency and tool life according to the invention, the upper limit for the hydroxyl value of the triester is more preferably 200 mgKOH/g and most preferably 150 mgKOH/g, while the lower limit is more preferably 0.1 mgKOH/g, even more preferably 0.5 mgKOH/g, yet more preferably 1 mgKOH/g, even yet more preferably 3 mgKOH/g and most preferably 5 mgKOH/g. The upper 5 limit for the saponification value of the ester is more preferably 400 mgKOH/g, while the lower limit is more preferably 200 mgKOH/g.

Here, the "hydroxyl value" is the value measured by the indicator titration method defined by JIS K 0070 "Method of measuring acid value, saponification value, ester value, iodine value, hydroxyl value and unsaponifiable matter of chemical products". The saponification value is the value measured by the indicator titration method of JIS K 2503 "Testing method of lubricating oil for aircraft".

There are no particular restrictions on the dynamic viscosity of the triester of the invention, but from the viewpoint of facilitating supply to machining sites, the upper limit for the dynamic viscosity at 40° C. is preferably 200 mm$^2$/s, more preferably 100 mm$^2$/s, even more preferably 75 mm$^2$/s and most preferably 50 mm$^2$/s. The lower limit is preferably 1 mm$^2$/s, even more preferably 3 mm$^2$/s and most preferably 5 mm$^2$/s.

There are no particular restrictions on the pour point and viscosity index of the ester of the invention, but the pour point is preferably no higher than −10° C. and even more preferably no higher than −20° C. The viscosity index is preferably between 100 and 200.

From the standpoint of improving the working efficiency and tool life, the content of the triester of the invention must be at least 1% by mass and is preferably at least 5% by mass and more preferably at least 10% by mass, based on the total composition weight. Also, the triester content must be no greater than 50% by mass and is preferably no greater than 45% by mass, more preferably no greater than 40% by mass and even more preferably no greater than 35% by mass, based on the total composition weight. If the triester content is greater than 50% by mass, stickiness will tend to increase, thereby reducing the handleability. As explained hereunder, the oil for metal working according to the second embodiment may contain additives, but if the triester content exceeds 50% by mass the improving effect of additives on the properties will tend to be inadequate.

The oil for metal working according to the second embodiment contains the aforementioned hydrocarbon oil and triester, but may also contain a conventional publicly known base oil as a lubricating oil in an amount that does not significantly reduce the performance. As such base oils there may be used, for example, esters other than the aforementioned triesters (diesters, polyol esters, etc.), polyoxyalkylene glycols and polyphenylethers and the like. There are no particular restrictions on the use of such base oils, but they are preferably used at no greater than 65% by mass, more preferably no greater than 50% by mass, even more preferably no greater than 30% by mass, yet more preferably no greater than 20% by mass and most preferably no greater than 10% by mass, based on the total composition weight.

The oil for metal working of the second embodiment may comprise only the aforementioned hydrocarbon oil and triester, but from the viewpoint of further increasing the working efficiency and tool life, it also preferably contains an oiliness agent. As oiliness agents there may be mentioned (A) alcohols, (B) carboxylic acids, (C) unsaturated carboxylic acid sulfides, (D) compounds represented by general formula (2-1) below, (E) compounds represented by general formula (2-2) below, (F) polyoxyalkylene compounds, (G) esters, (H) polyhydric alcohol hydrocarbylethers and (I) amines.

[Chemical Formula 14]

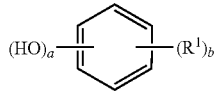
(2-1)

[wherein R1 represents a C1-C30 hydrocarbon group, a represents an integer of 1-6 and b represents an integer of 0-5.]

[Chemical Formula 15]

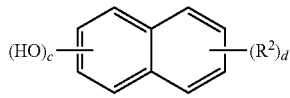
(2-2)

[wherein R2 represents a C1-C30 hydrocarbon group, c represents an integer of 1-6 and d represents an integer of 0-5.]

The (A) alcohol may be a monohydric alcohol or a polyhydric alcohol. From the standpoint of achieving even higher working efficiency and tool life, C1-C40 monohydric alcohols are preferred, C1-C25 alcohols are more preferred and C8-C18 alcohols are most preferred. More specifically, there may be mentioned as examples the alcohols composing the aforementioned base oil esters. These alcohols may be straight-chain or branched and either saturated or unsaturated, but from the standpoint of preventing sticking, they are preferably saturated.

The (B) carboxylic acid may be a monobasic acid or a polybasic acid. From the standpoint of achieving even higher working efficiency and tool life, C1-C40 monovalent carboxylic acids are preferred, C5-C25 carboxylic acids are more preferred and C5-C20 carboxylic acids are most preferred. More specifically, there may be mentioned as examples the carboxylic acids composing the esters for the aforementioned base oils. These carboxylic acids may be straight-chain or branched and either saturated or unsaturated, but from the standpoint of preventing sticking they are preferably saturated carboxylic acids.

As examples of the (C) unsaturated carboxylic acid sulfides there may be mentioned sulfides of unsaturated carboxylic acids among the aforementioned (B) carboxylic acids. As specific examples there may be mentioned sulfides of oleic acid.

As examples of C1-C30 hydrocarbon groups represented by $R^1$ in the (D) compounds represented by general formula (2-1) above, there may be mentioned C1-C30 straight-chain or branched alkyl, C5-C7 cycloalkyl, C6-C30 alkylcycloalkyl, C2-C30 straight-chain or branched alkenyl, C6-C10 aryl, C7-C30 alkylaryl and C7-C30 arylalkyl. Among these, C1-C30 straight-chain or branched alkyl groups are preferred, C1-C20 straight-chain or branched alkyl groups are more preferred, C1-C10 straight-chain or branched alkyl groups are even more preferred, and C1-C4 straight-chain or branched alkyl groups are most preferred. As examples of C1-C4 straight-chain or branched alkyl groups there may be mentioned methyl, ethyl, straight-chain or branched propyl and straight-chain or branched butyl.

The hydroxyl may be substituted at any position, but in the case of two or more hydroxyl groups they are preferably substituted at adjacent carbon atoms. The symbol a is preferably an integer of 1-3 and more preferably 2. The symbol b is preferably an integer of 0-3 and more preferably 1 or 2. As an example of a compound represented by general formula (2-1) there may be mentioned p-tert-butylcatechol.

As examples of C1-C30 hydrocarbon groups represented by $R^2$ in the (E) compounds represented by general formula (2-2) above, there may be mentioned the same examples of C1-C30 hydrocarbon groups represented by $R^1$ in general formula (2-1) above, and the preferred examples are also the same. The hydroxyl may be substituted at any position, but in the case of two or more hydroxyl groups they are preferably substituted at adjacent carbon atoms. The symbol c is preferably an integer of 1-3 and more preferably 2. The symbol d is preferably an integer of 0-3 and more preferably 1 or 2. As examples of compounds represented by general formula (2-2) there may be mentioned 2,2-dihydroxynaphthalene and 2,3-dihydroxynaphthalene.

As examples of the (F) polyoxyalkylene compounds there may be mentioned compounds represented by the following general formulas (2-3) and (2-4).

$$R^3O-(R^4O)_e-R^5 \qquad (2-3)$$

[wherein $R^3$ and $R^5$ each independently represent hydrogen or a C1-C30 hydrocarbon group, $R^4$ represents C2-C4 alkylene, and e represents an integer such that the number-average molecular weight is 100-3500.]

$$A-[(R^6O)_f-R^7]_g \qquad (2-4)$$

[wherein A represents the residue of a polyhydric alcohol having 3-10 hydroxyl groups of which all or a portion of the hydrogens of the hydroxyl groups have been removed, $R^6$ represents C2-C4 alkylene, $R^7$ represents hydrogen or a C1-C30 hydrocarbon group, f represents an integer such that the number-average molecular weight is 100-3500, and g represents the same number as the number of hydrogens removed from the hydroxyl groups of A.]

In general formula (2-3), at least one of $R^3$ and $R^5$ is preferably hydrogen. As examples of C1-C30 hydrocarbon groups represented by $R^3$ and $R^5$ there may be mentioned the same examples of C1-C30 hydrocarbon groups represented by $R^1$ of general formula (2-1) above, and the preferred examples are also the same. As specific examples of C2-C4 alkylene groups represented by $R^4$ there may be mentioned ethylene, propylene (methylethylene) and butylene (ethylethylene). The symbol e is preferably a integer such that the number-average molecular weight is 300-2000, and more preferably an integer such that the number-average molecular weight is 500-1500.

As specific examples of polyhydric alcohols having 3-10 hydroxyl groups of A in general formula (2-4) above, there may be mentioned polyhydric alcohols such as glycerin, polyglycerin (2-4 mers of glycerin such as diglycerin, triglycerin and tetraglycerin), trimethylolalkanes (trimethylolethane, trimethylolpropane, trimethylolbutane) and their 2-4 mers, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol-glycerin condensation products, adonitol, arabitol, xylitol, mannitol, iditol, talitol, dulcitol and allitol; and sugars such as xylose, arabinose, ribose, rhamnose, glucose, fructose, galactose, mannose, sorbose, cellobiose, mantose, isomantose, trehalose and sucrose. Preferred among these are glycerin, polyglycerin, trimethylolalkanes and their 2-4 mers, pentaerythritol, dipentaerythritol, sorbitol and sorbitan.

As examples of C2-C4 alkylene groups represented by $R^6$ there may be mentioned the same examples of C2-C4 alkylene groups represented by $R^4$ in general formula (2-3) above. As examples of C1-C30 hydrocarbon groups represented by $R^7$ there may be mentioned the same examples of C1-C30 hydrocarbon groups represented by $R^1$ in general formula (2-1) above, and the preferred examples are also the same. At least one of the g $R^7$ groups is preferably hydrogen, and more preferably all of them are hydrogen. The symbol f is preferably an integer such that the number-average molecular weight is 300-2000, and more preferably an integer such that the number-average molecular weight is 500-1500.

The alcohols in the (G) esters may be monohydric alcohols or polyhydric alcohols, and the carboxylic acids may be monobasic acids or polybasic acids. The "ester" referred to here is distinct from the triester which is the essential component of the oil for metal working according to the second embodiment. Throughout the following explanation, the former will be referred to as "ester oiliness agent".

The alcohol composing the ester oiliness agent may be a monohydric alcohol or polyhydric alcohol, and the acid composing the ester oiliness agent may be a monobasic acid or polybasic acid.

As monohydric alcohols there may be used C1-C24, preferably C1-C12 and even more preferably C1-C8 alcohols, which may be straight-chain or branched and may be saturated or unsaturated. As specific examples of C1-C24 alcohols there may be mentioned methanol, ethanol, straight-chain or branched propanol, straight-chain or branched butanol, straight-chain or branched pentanol, straight-chain or branched hexanol, straight-chain or branched heptanol, straight-chain or branched octanol, straight-chain or branched nonanol, straight-chain or branched decanol, straight-chain or branched undecanol, straight-chain or branched dodecanol, straight-chain or branched tridecanol, straight-chain or branched tetradecanol, straight-chain or branched pentadecanol, straight-chain or branched hexadecanol, straight-chain or branched heptadecanol, straight-chain or branched octadecanol, straight-chain or branched nonadecanol, straight-chain or branched eicosanol, straight-chain or branched heneicosanol, straight-chain or branched tricosanol, straight-chain or branched tetracosanol, and mixtures thereof.

As polyhydric alcohols there may be used C2-C10 and preferably C2-C6 alcohols. As specific examples of 2-10 polyhydric alcohols there may be mentioned dihydric alcohols such as ethylene glycol, diethylene glycol, polyethylene glycol (3-15 mers of ethylene glycol), propylene glycol, dipropylene glycol, polypropylene glycol (3-15 mers of propylene glycol), 1,3-propanediol, 1,2-propanediol, 1,3-butanediol, 1,4-butanediol, 2-methyl-1,2-propanediol, 2-methyl-1,3-propanediol, 1,2-pentanediol, 1,3-pentanediol, 1,4-pentanediol, 1,5-pentanediol and neopentyl glycol; polyhydric alcohols such as glycerin, polyglycerin (2-8 mers of glycerin, such as diglycerin, triglycerin, tetraglycerin and the like), trimethylolalkanes (trimethylolethane, trimethylolpropane, trimethylolbutane) and their 2-8 mers, pentaerythritol and its 2-4 mers, 1,2,4-butanetriol, 1,3,5-pentanetriol, 1,2,6-hexanetriol, 1,2,3,4-butanetetrol, sorbitol, sorbitan, sorbitol-glycerin condensation product, adonitol, arabitol, xylitol and mannitol; sugars such as xylose, arabinose, ribose, rhamnose, glucose, fructose, galactose, mannose, sorbose, cellobiose, maltose, isomaltose, trehalose and sucrose; and mixtures thereof.

Preferred among these polyhydric alcohols are 2-6 polyhydric alcohols such as ethylene glycol, diethylene glycol, polyethylene glycol (3-10 mers of ethylene glycol), propylene glycol, dipropylene glycol, polypropylene glycol (3-10 mers of propylene glycol), 1,3-propanediol, 2-methyl-1,2-propanediol, 2-methyl-1,3-propanediol, neopentyl glycol, glycerin, diglycerin, triglycerin, trimethylolalkanes (trimethylolethane, trimethylolpropane, trimethylolbutane) and their 2-4 mers, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol-glycerin condensation product, adonitol, arabitol, xylitol and mannitol, and mixtures thereof. More preferred are ethylene glycol, propylene glycol, neopentyl glycol, glycerin, trimethylolethane, trimethylolpropane, pentaerythritol, sorbitan and mixtures thereof. Most preferred among these are neopentyl glycol, trimethylolethane, trimethylolpropane, pentaerythritol and mixtures thereof, since these can yield higher heat and oxidation stability.

The alcohol composing the ester oiliness agent may be a monohydric alcohol or a polyhydric alcohol as mentioned above, but it is preferably a polyhydric alcohol from the viewpoint of achieving superior working efficiency and tool life, more easily obtaining a low pour point and improving the handleability in winter season and cold climates. Using a polyhydric alcohol ester will result in improved precision of the finishing surface of the working piece and an even greater anti-abrasive effect for tool blades during cutting and grinding.

In most cases a C2-C24 fatty acid will be used as the monobasic acid among acids for the ester oiliness agent, and such fatty acids may be straight-chain or branched and either saturated or unsaturated. As specific examples there may be mentioned saturated fatty acids such as acetic acid, propionic acid, straight-chain or branched butanoic acid, straight-chain or branched pentanoic acid, straight-chain or branched hexanoic acid, straight-chain or branched heptanoic acid, straight-chain or branched octanoic acid, straight-chain or branched nonanoic acid, straight-chain or branched decanoic acid, straight-chain or branched undecanoic acid, straight-chain or branched dodecanoic acid, straight-chain or branched tridecanoic acid, straight-chain or branched tetradecanoic acid, straight-chain or branched pentadecanoic acid, straight-chain or branched hexadecanoic acid, straight-chain or branched heptadecanoic acid, straight-chain or branched octadecanoic acid, straight-chain or branched hydroxyoctadecanoic acid, straight-chain or branched nonadecanoic acid, straight-chain or branched eicosanoic acid, straight-chain or branched heneicosanoic acid, straight-chain or branched docosanoic acid, straight-chain or branched tricosanoic acid and straight-chain or branched tetracosanoic acid; unsaturated fatty acids such as acrylic acid, straight-chain or branched butenoic acid, straight-chain or branched pentenoic acid, straight-chain or branched hexenoic acid, straight-chain or branched heptenoic acid, straight-chain or branched octenoic acid, straight-chain or branched nonenoic acid, straight-chain or branched decenoic acid, straight-chain or branched undecenoic acid, straight-chain or branched dodecenoic acid, straight-chain or branched tridecenoic acid, straight-chain or branched tetradecenoic acid, straight-chain or branched pentadecenoic acid, straight-chain or branched hexadecenoic acid, straight-chain or branched heptadecenoic acid, straight-chain or branched octadecenoic acid, straight-chain or branched hydroxyoctadecenoic acid, straight-chain or branched nonadecenoic acid, straight-chain or branched eicosenoic acid, straight-chain or branched heneicosenoic acid, straight-chain or branched docosenoic acid, straight-chain or branched tricosenoic acid and straight-chain or branched tetracosenoic acid; and mixtures thereof. Particularly preferred among these, from the standpoint of improving the working efficiency and tool life and the handleability, are C3-C20 saturated fatty acids, C3-C22 unsaturated fatty acids and mixtures thereof, among which C4-C18 saturated fatty acids, C4-C18 unsaturated fatty acids and mixtures thereof are more preferred and C4-C18 unsaturated fatty acids are even more preferred, while from the viewpoint of preventing sticking, C4-C18 saturated fatty acids are yet more preferred.

As polybasic acids there may be mentioned C2-C16 dibasic acids, trimellitic acid and the like. Such C2-C16 dibasic acids may be straight-chain or branched, and either saturated or unsaturated. As specific examples there may be mentioned ethanedioic acid, propanedioic acid, straight-chain or branched butanedjoic acid, straight-chain or branched pentanedioic acid, straight-chain or branched hexanedioic acid, straight-chain or branched heptanedioic acid, straight-chain or branched octanedioic acid, straight-chain or branched nonanedioic acid, straight-chain or branched decanedioic acid, straight-chain or branched undecanedioic acid, straight-chain or branched dodecanedioic acid, straight-chain or branched tridecanedioic acid, straight-chain or branched tetradecanedioic acid, straight-chain or branched heptadecanedioic acid, straight-chain or branched hexadecanedioic acid, straight-chain or branched hexenedioic acid, straight-chain or branched heptenedioic acid, straight-chain or branched octenedioic acid, straight-chain or branched nonenedioic acid, straight-chain or branched decenedioic acid, straight-chain or branched undecenedjoic acid, straight-chain or branched dodecenedioic acid, straight-chain or branched tridecenedioic acid, straight-chain or branched tetradecenedioic acid, straight-chain or branched heptadecenedioic acid, straight-chain or branched hexadecenedioic acid, and mixtures thereof.

The combination of the alcohol and acid in the ester oiliness agent may be as desired and is not particularly restricted, but the following esters may be mentioned as examples of ester oiliness agents to be used for the invention.

(G-1) Esters of monohydric alcohols and monobasic acids
(G-2) Esters of polyhydric alcohols and monobasic acids
(G-3) Esters of monohydric alcohols and polybasic acids
(G-4) Esters of polyhydric alcohols and polybasic acids
(G-5) Mixed esters of monohydric alcohol and polyhydric alcohol mixtures with polybasic acids
(G-6) Mixed esters of polyhydric alcohols with monobasic acid and polybasic acid mixtures
(G-7) Mixed esters of monohydric alcohol and polyhydric alcohol mixtures with monobasic acids and polybasic acids When a polyhydric alcohol is used as the alcohol component, the ester may be a total ester wherein all of the hydroxyl groups of the polyhydric alcohol are esterified, or it may be a partial ester wherein a portion of the hydroxyl groups remain as hydroxyl groups without esterification. Also, when a polybasic acid is used as the carboxylic acid component, the ester may be a total ester wherein all of the carboxyl groups of the polybasic acid are esterified, or it may be a partial ester wherein a portion of the carboxyl groups remain as carboxyl groups without esterification.

There are no particular restrictions on the total number of carbon atoms of the ester oiliness agent, but from the standpoint of improving the working efficiency and tool life, the ester preferably has a total number of carbon atoms of 7 or greater, more preferably 9 or greater and most preferably 11 or greater. From the standpoint of minimizing staining and corrosion and of compatibility with organic materials, the ester preferably has a total number of carbon atoms of no greater than 60, more preferably no greater than 45, even more preferably no greater than 26, yet more preferably no greater than 24 and most preferably no greater than 22.

As polyhydric alcohols of the (H) polyhydric alcohol hydrocarbylethers there are usually used those with 2-10 and preferably 2-6 hydroxyl groups. As specific examples of 2-10 polyhydric alcohols there may be mentioned dihydric alcohols such as ethylene glycol, diethylene glycol, polyethylene glycol (3-1Smers of ethylene glycol), propylene glycol, dipropylene glycol, polypropylene glycol (3-15 mers of propylene glycol), 1,3-propanediol, 1,2-propanediol, 1,3-butanediol, 1,4-butanediol, 2-methyl-1,2-propanediol, 2-methyl-1,3-propanediol, 1,2-pentanediol, 1,3-pentanediol, 1,4-pentanediol, 1,5-pentanediol and neopentyl glycol; polyhydric alcohols such as glycerin, polyglycerin (2-8 mers of glycerin, such as diglycerin, triglycerin, tetraglycerin and the like), trimethylolalkanes (trimethylolethane, trimethylolpropane, trimethylolbutane) and their 2-8 mers, pentaerythritol and its 2-4 mers, 1,2,4-butanetriol, 1,3,5-pentanetriol, 1,2,6-hexanetriol, 1,2,3,4-butanetetrol, sorbitol, sorbitan, sorbitol-glycerin condensation product, adonitol, arabitol, xylitol and mannitol; sugars such as xylose, arabinose, ribose, rhamnose, glucose, fructose, galactose, mannose, sorbose, cellobiose, maltose, isomaltose, trehalose and sucrose; and mixtures thereof Preferred among these polyhydric alcohols are 2-6 polyhydric alcohols such as ethylene glycol, diethylene glycol, polyethylene glycol (3-10 mers of ethylene glycol), propylene glycol, dipropylene glycol, polypropylene glycol (3-10 mers of propylene glycol), 1,3-propanediol, 2-methyl-1,2-propanediol, 2-methyl-1,3-propanediol, neopentyl glycol, glycerin, diglycerin, triglycerin, trimethylolalkanes (trimethylolethane, trimethylolpropane, trimethylolbutane, etc.) and their 2-4 mers, pentaerythritol, dipentaerythritol, 1,2,4-butanetriol, 1,3,5-pentanetriol, 1,2,6-hexanetriol, 1,2,3,4-butanetetrol, sorbitol, sorbitan, sorbitol-glycerin condensation product, adonitol, arabitol, xylitol and mannitol, and mixtures thereof. More preferred are ethylene glycol, propylene glycol, neopentyl glycol, glycerin, trimethylolethane, trimethylolpropane, pentaerythritol, sorbitan and mixtures thereof. Among these, glycerin is most preferred from the standpoint of increasing working efficiency and extending tool life.

As (H) polyhydric alcohol hydrocarbylethers there may be used ones obtained by hydrocarbyletherification of all or a portion of the hydroxyl groups of the aforementioned polyhydric alcohols. From the standpoint of increasing working efficiency and extending tool life, there are preferred polyhydric alcohols with hydrocarbyletherification of a portion of the hydroxyl groups (partially etherified). Here, a hydrocarbyl group is a C1-C24 hydrocarbon group such as C1-C24 alkyl, C2-C24 alkenyl, C5-C7 cycloalkyl, C6-C11 alkylcycloalkyl, C6-C10 aryl, C7-C18 alkylaryl, C7-C18 arylalkyl, or the like.

As C1-C24 alkyl groups there may be mentioned methyl, ethyl, n-propyl, isopropyl, n-butyl, isobutyl, sec-butyl, tert-butyl, straight-chain or branched pentyl, straight-chain or branched hexyl, straight-chain or branched heptyl, straight-chain or branched octyl, straight-chain or branched nonyl, straight-chain or branched decyl, straight-chain or branched undecyl, straight-chain or branched dodecyl, straight-chain or branched tridecyl, straight-chain or branched tetradecyl, straight-chain or branched pentadecyl, straight-chain or branched hexadecyl, straight-chain or branched heptadecyl, straight-chain or branched octadecyl, straight-chain or branched nonadecyl, straight-chain or branched eicosyl, straight-chain or branched heneicosyl, straight-chain or branched docosyl, straight-chain or branched tricosyl and straight-chain or branched tetracosyl.

As C2-C24 alkenyl groups there may be mentioned vinyl, straight-chain or branched propenyl, straight-chain or branched butenyl, straight-chain or branched pentenyl, straight-chain or branched hexenyl, straight-chain or branched heptenyl, straight-chain or branched octenyl, straight-chain or branched nonenyl, straight-chain or branched decenyl, straight-chain or branched undecenyl, straight-chain or branched dodecenyl, straight-chain or branched tridecenyl, straight-chain or branched tetradecenyl, straight-chain or branched pentadecenyl, straight-chain or branched hexadecenyl, straight-chain or branched heptadecenyl, straight-chain or branched octadecenyl, straight-chain or branched nonadecenyl, straight-chain or branched eicosenyl, straight-chain or branched heneicosenyl, straight-chain or branched docosenyl, straight-chain or branched tricosenyl and straight-chain or branched tetracosenyl.

As C5-C7 cycloalkyl groups there may be mentioned cyclopentyl, cyclohexyl and cycloheptyl. As C6-C11 alkylcycloalkyl groups there may be mentioned methylcyclopentyl, dimethylcyclopentyl (including all structural isomers), methylethylcyclopentyl (including all structural isomers), diethylcyclopentyl (including all structural isomers), methylcyclohexyl, dimethylcyclohexyl (including all structural isomers), methylethylcyclohexyl (including all structural isomers), diethylcyclohexyl (including all structural isomers), methylcycloheptyl, dimethylcycloheptyl (including all structural isomers), methylethylcycloheptyl (including all structural isomers) and diethylcycloheptyl (including all structural isomers).

As C6-C10 aryl groups there may be mentioned phenyl and naphthyl. As C7-C18 alkylaryl groups there may be mentioned tolyl (including all structural isomers), xylyl (including all structural isomers), ethylphenyl (including all structural isomers), straight-chain or branched propylphenyl (including all structural isomers), straight-chain or branched butylphenyl (including all structural isomers), straight-chain or branched pentylphenyl (including all structural isomers), straight-chain or branched hexylphenyl (including all structural isomers), straight-chain or branched heptylphenyl (including all structural isomers), straight-chain or branched octylphenyl (including all structural isomers), straight-chain or branched nonylphenyl (including all structural isomers), straight-chain or branched decylphenyl (including all structural isomers), straight-chain or branched undecylphenyl (including all structural isomers) and straight-chain or branched dodecylphenyl (including all structural isomers).

As C7-C12 arylalkyl groups there may be mentioned benzyl, phenylethyl, phenylpropyl (including propyl isomers), phenylbutyl (including butyl isomers), phenylpentyl (including pentyl isomers) and phenylhexyl (including hexyl isomers).

Preferred among these from the standpoint of increasing working efficiency and extending tool life are C2-C18 straight-chain or branched alkyl groups and C2-C18 straight-chain or branched alkenyl groups, among which C3-C12 straight-chain or branched alkyl and oleyl (residue obtained by removing hydroxyl from oleyl alcohol) are more preferred.

A monoamine is preferred for use as the (I) amine. The number of carbon atoms of the monoamine is preferably 6-24 and more preferably 12-24. Here, the number of carbon atoms is the number of carbon atoms of the monoamine, and when the monoamine has two or more hydrocarbon groups it is the total number of carbon atoms.

Monoamines to be used for the invention include primary monoamines, secondary monoamines and tertiary monoamines, although primary monoamines are preferred from the standpoint of increasing working efficiency and extending tool life.

As hydrocarbon groups bonded to the nitrogen atom of the monoamine there may be used alkyl, alkenyl, cycloalkyl, alkylcycloalkyl, aryl, alkylaryl, arylalkyl and the like, although alkyl and alkenyl groups are preferred from the standpoint of increasing working efficiency and extending tool life. The alkyl and alkenyl groups may be straight-chain or branched, but are preferably straight-chain from the standpoint of increasing working efficiency and extending tool life.

As specific examples of preferred monoamines to be used for the invention there may be mentioned hexylamine (including all isomers), heptylamine (including all isomers), octylamine (including all isomers), nonylamine (including all isomers), decylamine (including all isomers), undecylamine (including all isomers), dodecylamine (including all isomers), tridecylamine (including all isomers), tetradecylamine (including all isomers), pentadecylamine (including all isomers), hexadecylamine (including all isomers), heptadecylamine (including all isomers), octadecylamine (including all isomers), nonadecylamine (including all isomers), eicosylamine (including all isomers), heneicosylamine (including all isomers), docosylamine (including all isomers), tricosylamine (including all isomers), tetracosylamine (including all isomers), octadecenylamine (including all isomers) (including oleylamine, etc.), and mixtures of two or more thereof. Among these, C12-C24 primary monoamines are preferred, C14-20 primary monoamines are more preferred and C16-18 primary monoamines are even more preferred, from the standpoint of increasing working efficiency and extending tool life.

According to the invention, one selected from among the aforementioned oiliness agents (A) to (H) may be used, or a mixture of two or more thereof may be used. Of these, one or a mixture of two or more selected from among (B) carboxylic acids and (I) amines are preferred from the standpoint of improving the working efficiency and tool life.

There are no particular restrictions on the content of the oiliness agent, but from the standpoint of improving the working efficiency and tool life, it is preferably at least 0.01% by mass, more preferably at least 0.05% by mass and even more preferably at least 0.1% by mass based on the total composition weight. From the standpoint of stability, the oiliness agent content is preferably no greater than 15% by mass, more preferably no greater than 10% by mass and even more preferably no greater than 5% by mass based on the total composition weight.

A metal working oil according to the invention preferably further contains an extreme pressure agent. As preferred extreme pressure agents there may be mentioned the sulfur compounds and phosphorus compounds mentioned below.

There are no particular restrictions on sulfur compounds to be used for the invention so long as the properties as an oil composition for metal working are not impaired, but preferred for use are dihydrocarbyl polysulfide, sulfidized esters, sulfidized mineral oils, zinc dithiophosphate compounds, zinc dithiocarbaminate compounds, molybdenum dithiophosphate compounds and molybdenum thiocarbaminate.

Dihydrocarbyl polysulfides are sulfur-based compounds generally known as polysulfides or sulfidized olefins, and specifically refer to compounds represented by the following general formula (2-5):

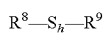
(2-5)

[wherein $R^8$ and $R^9$ are the same or different and each represents C3-C20 straight-chain or branched alkyl, C6-C20 aryl, C6-C20 alkylaryl or C6-C20 arylalkyl, and h represents an integer of 2-6 and preferably 2-5.]

As specific examples of $R^8$ and $R^9$ in general formula (2-5) above there may be mentioned straight-chain or branched alkyl groups such as n-propyl, isopropyl, n-butyl, isobutyl, sec-butyl, tert-butyl, straight-chain or branched pentyl, straight-chain or branched hexyl, straight-chain or branched heptyl, straight-chain or branched octyl, straight-chain or branched nonyl, straight-chain or branched decyl, straight-chain or branched undecyl, straight-chain or branched dodecyl, straight-chain or branched tridecyl, straight-chain or branched tetradecyl, straight-chain or branched pentadecyl, straight-chain or branched hexadecyl, straight-chain or branched heptadecyl, straight-chain or branched octadecyl, straight-chain or branched nonadecyl and straight-chain or branched eicosyl; aryl groups such as phenyl and naphthyl; alkylaryl groups such as tolyl (including all structural isomers), ethylphenyl (including all structural isomers), straight-chain or branched propylphenyl (including all structural isomers), straight-chain or branched butylphenyl (including all structural isomers), straight-chain or branched pentylphenyl (including all structural isomers), straight-chain or branched hexylphenyl (including all structural isomers), straight-chain or branched heptylphenyl (including all structural isomers), straight-chain or branched octylphenyl (including all structural isomers), straight-chain or branched nonylphenyl (including all structural isomers), straight-chain or branched decylphenyl (including all structural isomers), straight-chain or branched undecylphenyl (including all structural isomers), straight-chain or branched dodecylphenyl (including all structural isomers), xylyl (including all structural isomers), ethylmethylphenyl (including all structural isomers), diethylphenyl (including all structural isomers), di(straight-chain or branched)propylphenyl (including all structural isomers), di(straight-chain or branched)butylphenyl (including all structural isomers), methylnaphthyl (including all structural isomers), ethylnaphthyl (including all structural isomers), straight-chain or branched propylnaphthyl (including all structural isomers), straight-chain or branched butylnaphthyl (including all structural isomers), dimethylnaphthyl (including all structural isomers), ethylmethylnaphthyl (including all structural isomers), diethylnaphthyl (including all structural isomers), di(straight-chain or branched)propylnaphthyl (including all structural isomers) and di(straight-chain or branched)butylnaphthyl (including all structural isomers); and arylalkyl groups such as benzyl, phenylethyl (including all isomers) and phenylpropyl (including all isomers). Among these there are preferred compounds wherein $R^8$ and $R^9$ of general formula (2-5) are C3-C18 alkyl groups derived from propylene, 1-butene or isobutylene, or C6-C8 aryl and alkylaryl groups, and as examples of such groups there may be mentioned alkyl groups such as isopropyl, propylene dimer-derived branched hexyl (including all branched isomers), propylene trimer-derived branched nonyl (including all branched isomers), propylene tetramer-derived branched dodecyl (including all branched isomers), propylene pentamer-derived branched pentadecyl (including all branched isomers), propylene hexamer-derived branched octadecyl (including all branched isomers), sec-butyl, tert-butyl, 1-butene dimer-derived branched octyl (including all branched isomers), isobutylene dimer-derived branched octyl (including all branched isomers), 1-butene trimer-derived branched dodecyl (including all branched isomers), isobutylene trimer-derived branched dodecyl (including all branched isomers), 1-butene tetramer-derived branched hexadecyl (including all branched isomers) and isobutylene tetramer-derived branched hexadecyl (including all branched isomers); alkylaryl groups such as phenyl, tolyl (including all structural isomers), ethylphenyl (including all structural isomers) and xylyl (including all structural isomers); arylalkyl groups such as benzyl and phenylethyl (including all isomers).

More preferred as $R^8$ and $R^9$ of general formula (2-5) above from the standpoint of improving the working efficiency and tool life are, independently, C3-C18 branched alkyl groups derived from ethylene or propylene, with C6-C15 branched alkyl groups derived from ethylene or propylene being particularly preferred.

As specific examples of sulfidized esters there may be mentioned esters obtained by using desired methods for sulfidization of animal and vegetable oils such as beef tallow, lard, fish oil, rapeseed oil and soybean oil; unsaturated fatty acid esters obtained by reacting unsaturated fatty acids (including oleic acid, linoleic acid and fatty acids extracted from the aforementioned animal and vegetable oils) with various alcohols; and mixtures thereof.

Sulfidized mineral oils are obtained by dissolving elemental sulfur in mineral oils. The mineral oils used for sulfidized mineral oils according to the invention are not particularly restricted, and specifically there may be mentioned paraffin-based mineral oils or naphthene-based mineral oils which are lube-oil distillates obtained by atmospheric distillation and vacuum distillation of crude oil, with refinement by appropriate combinations of refining treatments such as solvent deasphalting, solvent extraction, hydrocracking, solvent dewaxing, catalytic dewaxing, hydrogenation refining, sulfuric acid cleaning and clay treatment. Elemental sulfur may be used in any of various forms such as bulk, powder or molten liquid forms, but using elemental sulfur in powder or molten liquid form is preferred as it allows efficient dissolution in the base oil. Molten liquid elemental sulfur permits mixture of liquids and is therefore advantageous by notably shortening the time required for dissolution, but it must be handled at above the melting point of elemental sulfur and therefore necessitates special heating equipment and the like, and therefore is not always easy to manage given the risk associated with handling in high-temperature environments. In contrast, elemental sulfur powder is inexpensive and easy to manage while its dissolution time is sufficiently short, and it is therefore particularly preferred. There are no particular restrictions on the sulfur content of the sulfidized mineral oil for the invention, but normally it is preferably 0.05-1.0% by mass and more preferably 0.1-0.5% by mass based on the total sulfidized mineral oil weight.

Zinc dithiophosphate compounds, zinc dithiocarbaminate compounds, molybdenum dithiophosphate compounds and molybdenum dithiocarbaminate compounds are compounds represented by the following general formulas (2-6) to (2-9):

[Chemical Formula 16]

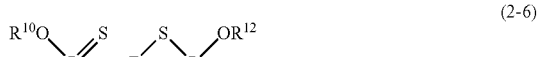

(2-6)

[Chemical Formula 17]

(2-7)

[Chemical Formula 18]

(2-8)

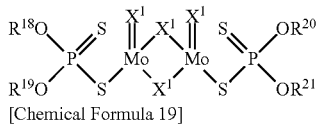
[Chemical Formula 19]

(2-9)

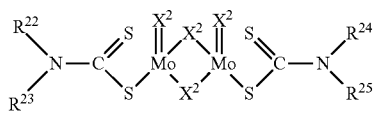

[wherein $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ may be the same or different and each represents a C1 or greater hydrocarbon group, and $X^1$ and $X^2$ each represents oxygen or sulfur].

As specific examples of hydrocarbon groups represented by $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$ and $R^{25}$ there may be mentioned alkyl groups such as methyl, ethyl, propyl (including all branched isomers), butyl (including all branched isomers), pentyl (including all branched isomers), hexyl (including all branched isomers), heptyl (including all branched isomers), octyl (including all branched isomers), nonyl (including all branched isomers), decyl (including all branched isomers), undecyl (including all branched isomers), dodecyl (including all branched isomers), tridecyl (including all branched isomers), tetradecyl (including all branched isomers), pentadecyl (including all branched isomers), hexadecyl (including all branched isomers), heptadecyl (including all branched isomers), octadecyl (including all branched isomers), nonadecyl (including all branched isomers), eicosyl (including all branched isomers), heneicosyl (including all branched isomers), docosyl (including all branched isomers), tricosyl (including all branched isomers) and tetracosyl (including all branched isomers); cycloalkyl groups such as cyclopentyl, cyclohexyl and cycloheptyl; alkylcycloalkyl groups such as methylcyclopentyl (including all substituted isomers), ethylcyclopentyl (including all substituted isomers), dimethylcyclopentyl (including all substituted isomers), propylcyclopentyl (including all branched isomers and substituted isomers), methylethylcyclopentyl (including all substituted isomers), trimethylcyclopentyl (including all substituted isomers), butylcyclopentyl (including all branched isomers and substituted isomers), methylpropylcyclopentyl (including all branched isomers and substituted isomers), diethylcyclopentyl (including all substituted isomers), dimethylethylcyclopentyl (including all substituted isomers), methylcyclohexyl (including all substituted isomers), ethylcyclohexyl (including all substituted isomers), dimethylcyclohexyl (including all substituted isomers), propylcyclohexyl (including all branched isomers and substituted isomers), methylethylcyclohexyl (including all substituted isomers), trimethylcyclohexyl (including all substituted isomers), butylcyclohexyl (including all branched isomers and substituted isomers), methylpropylcyclohexyl (including all branched isomers and substituted isomers), diethylcyclohexyl (including all substituted isomers), dimethylethylcyclohexyl (including all substituted isomers), methylcycloheptyl (including all substituted isomers), ethylcycloheptyl (including all substituted isomers), dimethylcycloheptyl (including all substituted isomers), propylcycloheptyl (including all branched isomers and substituted isomers), methylethylcycloheptyl (including all substituted isomers), trimethylcycloheptyl (including all substituted isomers), butylcycloheptyl (including all branched isomers and substituted isomers), methylpropylcycloheptyl (including all branched isomers and substituted isomers), diethylcycloheptyl (including all substituted isomers) and dimethylethylcycloheptyl (including all substituted isomers); aryl groups such as phenyl and naphthyl; alkylaryl groups such as tolyl (including all substituted isomers), xylyl (including all substituted isomers), ethylphenyl (including all substituted isomers), propylphenyl (including all branched isomers and substituted isomers), methylethylphenyl (including all substituted isomers), trimethylphenyl (including all substituted isomers), butylphenyl (including all branched isomers and substituted isomers), methylpropylphenyl (including all branched isomers and substituted isomers), diethylphenyl (including all substituted isomers), dimethylethylphenyl (including all substituted isomers), pentylphenyl (including all branched isomers and substituted isomers), hexylphenyl (including all branched isomers and substituted isomers), heptylphenyl (including all branched isomers and substituted isomers), octylphenyl (including all branched isomers and substituted isomers), nonylphenyl (including all branched isomers and substituted isomers), decylphenyl (including all branched isomers and substituted isomers), undecylphenyl (including all branched isomers and substituted isomers), dodecylphenyl (including all branched isomers and substituted isomers), tridecylphenyl (including all branched isomers and substituted isomers), tetradecylphenyl (including all branched isomers and substituted isomers), pentadecylphenyl (including all branched isomers and substituted isomers), hexadecylphenyl (including all branched isomers and substituted isomers), heptadecylphenyl (including all branched isomers and substituted isomers) and octadecylphenyl (including all branched isomers and substituted isomers); and arylalkyl groups such as benzyl, phenethyl, phenylpropyl (including all branched isomers) and phenylbutyl (including all branched isomers).

According to the invention, using at least one compound selected from the group consisting of dihydrocarbyl polysulfide and sulfidized esters among these sulfur compounds is preferred in order to obtain an even higher level of improved working efficiency and tool life.

As specific examples of phosphorus compounds according to the invention there may be mentioned phosphoric acid esters, acidic phosphoric acid esters, acidic phosphoric acid ester amine salts, chlorinated phosphoric acid esters, phosphorous acid esters and phosphorothionates, as well as metal salts of the phosphorus compounds represented by the following general formulas (2-10) and (2-11). These phosphorus compounds may be esters of phosphoric acid, phosphorous acid or thiophosphoric acid with alkanols or polyether alcohols, or they may be derivatives thereof.

[Chemical Formula 20]

(2-10)

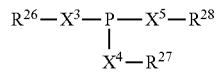

[wherein $X^3$, $X^4$ and $X^5$ may be the same or different and each represents oxygen or sulfur, with at least two of $X^3$, $X^4$ and $X^5$ being oxygen, and $R^{26}$, $R^{27}$ and $R^{28}$ may be the same or different and each represents hydrogen or a C1-C30 hydrocarbon group].

[Chemical Formula 21]

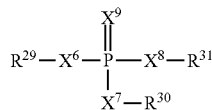

(2-11)

[wherein $X^6$, $X^7$, $X^8$ and $X^9$ may be the same or different and each represents oxygen or sulfur, with at least three of $X^6$, $X^7$, $X^8$ and $X^9$ being oxygen, and $R^{29}$, $R^{30}$ and $R^{31}$ may be the same or different and each represents hydrogen or a C1-C30 hydrocarbon group].

More specifically, as phosphoric acid esters there may be mentioned tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, trixylenyl phosphate, cresyldiphenyl phosphate and xylenyldiphenyl phosphate;

as acidic phosphoric acid esters there may be mentioned monobutyl acid phosphate, monopentyl acid phosphate, monohexyl acid phosphate, monoheptyl acid phosphate, monooctyl acid phosphate, monononyl acid phosphate, monodecyl acid phosphate, monoundecyl acid phosphate, monododecyl acid phosphate, monotridecyl acid phosphate, monotetradecyl acid phosphate, monopentadecyl acid phosphate, monohexadecyl acid phosphate, monoheptadecyl acid phosphate, monooctadecyl acid phosphate, monooleyl acid phosphate, dibutyl acid phosphate, dipentyl acid phosphate, dihexyl acid phosphate, diheptyl acid phosphate, dioctyl acid phosphate, dinonyl acid phosphate, didecyl acid phosphate, diundecyl acid phosphate, didodecyl acid phosphate, ditridecyl acid phosphate, ditetradecyl acid phosphate, dipentadecyl acid phosphate, dihexadecyl acid phosphate, diheptadecyl acid phosphate, dioctadecyl acid phosphate and dioleyl acid phosphate;

as acidic phosphoric acid ester amine salts there may be mentioned salts of amines such as methylamines, ethylamines, propylamines, butylamines, pentylamines, hexylamines, heptylamines, octylamines, dimethylamines, diethylamines, dipropylamines, dibutylamines, dipentylamines, dihexylamines, diheptylamines, dioctylamines, trimethylamines, triethylamines, tripropylamines, tributylamines, tripentylamines, trihexylamines, triheptylamine and trioctylamines, with the aforementioned acidic phosphoric acid esters;

as chlorinated phosphoric acid esters there may be mentioned tris-dichloropropyl phosphate, tris-chloroethyl phosphate, tris-chlorophenyl phosphate and polyoxyalkylene-bis[di(chloroalkyl)] phosphate;

as phosphorous acid esters there may be mentioned dibutyl phosphite, dipentyl phosphite, dihexyl phosphite, diheptyl phosphite, dioctyl phosphite, dinonyl phosphite, didecyl phosphite, diundecyl phosphite, didodecyl phosphite, dioleyl phosphite, diphenyl phosphite, dicresyl phosphite, tributyl phosphite, tripentyl phosphite, trihexyl phosphite, triheptyl phosphite, trioctyl phosphite, trinonyl phosphite, tridecyl phosphite, triundecyl phosphite, tridodecyl phosphite, trioleyl phosphite, triphenyl phosphite and tricresyl phosphite;

and as phosphorothionates there may be mentioned tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyldiphenyl phosphorothionate, xylenyldiphenyl phosphorothionate, tris(n-propylphenyl) phosphorothionate, tris(isopropylphenyl) phosphorothionate, tris(n-butylphenyl) phosphorothionate, tris(isobutylphenyl) phosphorothionate, tris(s-butylphenyl) phosphorothionate and tris(t-butylphenyl) phosphorothionate.

For metal salts of the phosphorus compounds represented by general formulas (2-10) and (2-11) above, alkyl, cycloalkyl, alkenyl, alkylcycloalkyl, aryl, alkylaryl and arylalkyl groups may be mentioned as specific examples of C1-C30 hydrocarbon groups represented by $R^{26}$-$R^{31}$ in the formulas.

As examples the aforementioned alkyl groups there may be mentioned alkyl groups such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl and octadecyl (where the alkyl groups may be straight-chain or branched).

As the aforementioned cycloalkyl groups there may be mentioned C5-C7 cycloalkyl groups such as cyclopentyl, cyclohexyl and cycloheptyl. As examples of the aforementioned alkylcycloalkyl groups there may be mentioned C6-C11 alkylcycloalkyl groups such as methylcyclopentyl, dimethylcyclopentyl, methylethylcyclopentyl, diethylcyclopentyl, methylcyclohexyl, dimethylcyclohexyl, methylethylcyclohexyl, diethylcyclohexyl, methylcycloheptyl, dimethylcycloheptyl, methylethylcycloheptyl and diethylcycloheptyl (with any positions of substitution of the alkyl groups on the cycloalkyl groups).

As examples of the aforementioned alkenyl groups there may be mentioned alkenyl groups such as butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl and octadecenyl (where the alkenyl groups may be straight-chain or branched, and the double bonds may be at any positions).

As examples of the aforementioned aryl groups there may be mentioned aryl groups such as phenyl and naphthyl. As examples of the aforementioned alkylaryl groups there may be mentioned C7-C18 alkylaryl groups such as tolyl, xylyl, ethylphenyl, propylphenyl, butylphenyl, pentylphenyl, hexylphenyl, heptylphenyl, octylphenyl, nonylphenyl, decylphenyl, undecylphenyl and dodecylphenyl (where the alkyl groups may be straight-chain or branched and substituted at any positions on the aryl groups).

As examples of the aforementioned arylalkyl groups there may be mentioned C7-C12 arylalkyl groups such as benzyl, phenylethyl, phenylpropyl, phenylbutyl, phenylpentyl and phenylhexyl (where the alkyl groups may be straight-chain or branched).

The C1-C30 hydrocarbon groups represented by $R^{26}$—$R^{31}$ are preferably C1-C30 alkyl groups or C6-C24 aryl groups, and are more preferably C3-C18 alkyl groups and even more preferably C4-C12 alkyl groups.

$R^{26}$, $R^{27}$ and $R^{28}$ may be the same or different and each represents hydrogen or an aforementioned hydrocarbon group, and preferably among $R^{26}$, $R^{27}$ and $R^{28}$, one to three are the aforementioned hydrocarbon groups, more preferably one or two are the aforementioned hydrocarbon groups and even more preferably two are the aforementioned hydrocarbon groups.

$R^{29}$, $R^{30}$ and $R^{31}$ may be the same or different and each represents hydrogen or an aforementioned hydrocarbon group, and preferably among $R^{29}$, $R^{30}$ and $R^{31}$, one to three are the aforementioned hydrocarbon groups, more preferably one or two are the aforementioned hydrocarbon groups and even more preferably two are the aforementioned hydrocarbon groups.

In the phosphorus compounds represented by general formula (2-10), at least two of $X^3$-$X^5$ must be oxygen, but preferably all of $X^3$-$X^5$ are oxygen.

In the phosphorus compounds represented by general formula (2-11), at least three of $X^6$-$X^9$ must be oxygen, but preferably all of $X^6$-$X^9$ are oxygen.

As examples of phosphorus compounds represented by general formula (2-10) there may be mentioned phosphorous acid and monothiophosphorous acid; phosphorous acid monoesters and monothiophosphorous acid monoesters having one of the aforementioned C1-C30 hydrocarbon groups; phosphorous acid diesters and monothiophosphorous acid diesters having two of the aforementioned C1-C30 hydrocarbon groups; phosphorous acid triesters and monothiophosphorous acid triesters having three of the aforementioned C1-C30 hydrocarbon groups; and mixtures thereof. Among these, phosphorous acid monoesters and phosphorous acid diesters are preferred, and phosphorous acid diesters are especially preferred.

As examples of phosphorus compounds represented by general formula (2-11) there may be mentioned phosphoric acid and monothiophosphoric acid; phosphoric acid monoesters and monothiophosphoric acid monoesters having one of the aforementioned C1-C30 hydrocarbon groups; phosphoric acid diesters and monothiophosphoric acid diesters having two of the aforementioned C1-C30 hydrocarbon groups; phosphoric acid triesters and monothiophosphoric acid triesters having three of the aforementioned C1-C30 hydrocarbon groups; and mixtures thereof. Among these, phosphoric acid monoesters and phosphoric acid diesters are preferred, and phosphoric acid diesters are especially preferred.

As metal salts of the phosphorus compounds represented by general formula (2-10) and (2-11) there may be mentioned salts of the aforementioned phosphorus compounds wherein all or a portion of the acidic hydrogens are neutralized with a metal base. As such metal bases there may be mentioned metal oxides, metal hydroxides, metal carbonates and metal chlorides, and as the metals thereof there may be mentioned specifically alkali metals such as lithium, sodium, potassium and cesium, alkaline earth metals such as calcium, magnesium and barium, and heavy metals such as zinc, copper, iron, lead, nickel, silver and manganese. Preferred among these are alkaline earth metals such as calcium and magnesium, and zinc.

These phosphorus compound metal salts will differ in structure depending on the valence of the metal and the number of OH groups or SH groups in the phosphorus compound, and therefore no limitations are placed on the structure; however, when 1 mole of zinc oxide is reacted with 2 moles of a phosphoric acid diester (with one OH group), for example, a compound having the structure represented by formula (2-12) below may be obtained as the major component, although polymerized molecules may also be present.

[Chemical Formula 22]

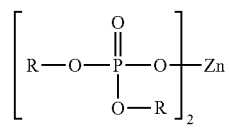

(2-12)

Also, when 1 mole of zinc oxide is reacted with 1 mole of a phosphoric acid monoester (with two OH groups), for example, a compound having the structure represented by formula (2-13) below may be obtained as the major component, although polymerized molecules may also be present.

[Chemical Formula 23]

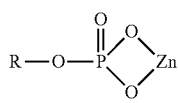

(2-13)

Two or more of these may also be used in admixture.

According to the invention, phosphoric acid esters, acidic phosphoric acid esters and acidic phosphoric acid ester amine salts are preferred among the phosphorus compounds mentioned above because they can result in a greater effect of improving the working efficiency and tool life.

The oil for metal working according to the second embodiment can also be applied for purposes other than metal working, as will be explained hereunder, and when the oil for metal working according to the second embodiment is used as a sliding surface oil for a machine tool, it preferably comprises an acidic phosphoric acid ester or an acidic phosphoric acid ester amine salt. When the oil for metal working of the second embodiment is used as a hydraulic oil, a phosphoric acid ester is preferred. When it is used as both a sliding surface oil and a hydraulic oil, it is preferred to employ a combination of a phosphoric acid ester with at least one selected from among acidic phosphoric acid esters and acidic phosphoric acid ester amine salts.

The oil for metal working according to the second embodiment may contain either a sulfur compound or a phosphorus compound, or it may contain both a sulfur compound and a phosphorus compound. From the viewpoint of further increasing the improving effect on the working efficiency and tool life, it preferably contains a phosphorus compound or both a sulfur compound and a phosphorus compound, and more preferably it contains both a sulfur compound and a phosphorus compound.

The content of the extreme pressure agent may be as desired, but from the standpoint of improving the working efficiency and tool life, it is preferably at least 0.005% by mass, more preferably at least 0.01% by mass and even more preferably at least 0.05% by mass, based on the total composition weight. From the viewpoint of preventing abnormal wear, the extreme pressure agent content is preferably no greater than 15% by mass, more preferably no greater than 10% by mass and even more preferably no greater than 7% by mass, based on the total composition weight.

According to the invention, the aforementioned oiliness agent or extreme pressure agent may be used alone, but preferably the oiliness agent and extreme pressure agent are used in combination from the viewpoint of achieving an even superior improving effect on the working efficiency and tool life.

The oil for metal working of the second embodiment also preferably contains an organic acid salt from the viewpoint of obtaining even superior working efficiency and tool life. As organic acid salts there are preferably used sulfonates, phenates and salicylates, as well as mixtures thereof. As cationic components of these organic acid salts there may be mentioned alkali metals such as sodium and potassium; alkaline earth metals such as magnesium, calcium and barium; amines including ammonia, alkylamines having C1-C3 alkyl group (monomethylamine, dimethylamine, trimethylamine, monoethylamine, diethylamine, triethylamine, monopropylamine, dipropylamine, tripropylamine, etc.), alkanolamines having C1-C3 alkanol group (monomethanolamine, dimethanolamine, trimethanolamine, monoethanolamine, diethanolamine, triethanolamine, monopropanolamine, dipropanolamine, tripropanolamine, etc.), and zinc, among which alkali metals and alkaline earth metals are preferred, and calcium is particularly preferred. Using an alkali metal or alkaline earth metal as the cationic component of the organic acid salt will tend to produce even higher lubricity.

The total base number of the organic acid salt is preferably 50-500 mgKOH/g and more preferably 100-450 mgKOH/g. If the total base number of the organic acid salt is less than 100 mgKOH/g the lubricity-enhancing effect of the organic acid salt addition will tend to be unsatisfactory, while organic acid salts with a the total base number of greater than 500 mgKOH/g are not preferred because they are generally very difficult to produce and obtain. The total base number referred to here is the total base number[mgKOH/g] determined by the perchlorate method, with measurement according to JIS K 2501 "Petroleum Products and Lubricants—Determination of Neutralization Number", Section 7.

The content of the organic acid salt is preferably 0.1-30% by mass, more preferably 0.5-25% by mass and even more preferably 1-20% by mass based on the total composition weight. If the organic acid salt content is below the aforementioned lower limit the improving effect on the working efficiency and tool life by the organic acid salt addition will tend to be unsatisfactory, while if it is above the aforementioned upper limit the stability of the metal working oil composition will be reduced and deposits will tend to form.

The sulfonate used may be one produced by any desired process. For example, there may be used an alkali metal salt, alkaline earth metal salt or amine salt of an alkylaromaticsulfonic acid obtained by sulfonation of an alkylaromatic compound with a molecular weight of 100-1500 and preferably 200-700, or a mixture thereof. As the alkylaromaticsulfonic acid referred to here, there may be mentioned synthetic sulfonic acids including sulfonated alkylaromatic compounds of lube-oil distillates of common mineral oils, petroleum sulfonic acids such as "mahogany acid" yielded as a by-product of white oil production, sulfonated products of alkylbenzenes with straight-chain or branched alkyl groups, which are by-products in production plants for alkylbenzenes used as starting materials for detergents and are obtained by alkylation of benzene with polyolefins, or sulfonated alkylnaphthalenes such as dinonylnaphthalene. There may also be mentioned "neutral (normal) sulfonates" obtained by reacting the aforementioned alkylaromaticsulfonic acids with alkali metal salts (alkali metal oxides, hydroxides or the like), alkaline earth metal salts (alkaline earth metal oxides, hydroxides or the like) or the aforementioned amines (ammonia, alkylamines, alkanolamines, etc.); "basic sulfonates" obtained by heating a neutral (normal) sulfonate with an excess of an alkali metal salt, alkaline earth metal salt or amine in the presence of water; "carbonated ultrabasic sulfonates" obtained by reacting a neutral (normal) sulfonate with an alkali metal salt, alkaline earth metal salt or amine in the presence of carbon dioxide gas; "borated ultrabasic sulfonates" produced by reacting a neutral (normal) sulfonate with an alkali metal salt, alkaline earth metal salt or amine and a boric acid compound such as boric acid or boric anhydride, or by reacting a carbonated ultrabasic sulfonate with a boric acid compound such as boric acid or boric anhydride; and mixtures of these compounds.

As phenates there may be mentioned, specifically, neutral phenates obtained by reacting an alkylphenol having 1-2 C4-C20 alkyl groups with an alkali metal salt (alkali metal oxide, hydroxide or the like), an alkaline earth metal salt (alkaline earth metal oxide, hydroxide or the like) or one of the aforementioned amines (ammonia, alkylamine, alkanolamine, etc.) in the presence or in the absence of elemental sulfur; basic phenates obtained by heating a neutral phenate with an excess of an alkali metal salt, alkaline earth metal salt or amine in the presence of water; "carbonated ultrabasic phenates" obtained by reacting a neutral phenate with an alkali metal salt, alkaline earth metal salt or amine in the presence of carbon dioxide gas; "borated ultrabasic phenates" produced by reacting a neutral phenate with an alkali metal salt, alkaline earth metal salt or amine and a boric acid compound such as boric acid or boric anhydride, or by reacting a carbonated ultrabasic phenate with a boric acid compound such as boric acid or boric anhydride; and mixtures of these compounds.

As salicylates there may be mentioned, specifically, neutral salicylates obtained by reacting an alkylsalicylic acid having one or two C4-C20 alkyl groups with an alkali metal salt (alkali metal oxide, hydroxide or the like), an alkaline earth metal salt (alkaline earth metal oxide, hydroxide or the like) or one of the aforementioned amines (ammonia, alkylamine, alkanolamine, etc.) in the presence or in the absence of elemental sulfur; basic salicylates obtained by heating a neutral salicylate with an excess of an alkali metal salt, alkaline earth metal salt or amine in the presence of water; "carbonated ultrabasic salicylates" obtained by reacting a neutral salicylate with an alkali metal salt, alkaline earth metal salt or amine in the presence of carbon dioxide gas; "borated ultrabasic salicylates" produced by reacting a neutral salicylate with an alkali metal salt, alkaline earth metal salt or amine and a boric acid compound such as boric acid or boric anhydride, or by reacting a carbonated ultrabasic salicylate with a boric acid compound such as boric acid or boric anhydride; and mixtures of these compounds.

According to the invention, any of the organic acid salts may be used alone or the organic acid salts may be used in combination with other additives. From the standpoint of further increasing the working efficiency and tool life, it is preferred to use the organic acid salt in combination with the aforementioned extreme pressure agent, and it is particularly preferred to used a combination of three components, a sulfur compound, a phosphorus compound and an organic acid salt.

The oil for metal working of the second embodiment also preferably comprises an antioxidant. Addition of an antioxidant can prevent sticking caused by degradation of the constituent components, while further enhancing the heat and oxidation stability.

As antioxidants to be used there may be mentioned phenol-based antioxidants, amine-based antioxidants, zinc dithiophosphate-based antioxidants, and antioxidants used as food additives.

As phenol-based antioxidants there may be used any phenol-based compounds that are employed as antioxidants for lubricating oils, with no particular restrictions, and as preferred examples there may be mentioned one or more alkylphenol compounds selected from among compounds represented by the following general formulas (2-14) and (2-15).

[Chemical Formula 24]

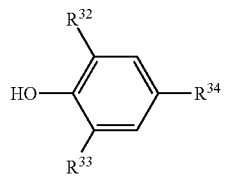

(2-14)

[wherein $R^{32}$ represents C1-C4 alkyl, $R^{33}$ represents hydrogen or C1-C4 alkyl, and $R^{34}$ represents hydrogen, C1-C4 alkyl or a group represented by the following general formula (i) or (ii):

[Chemical Formula 25]

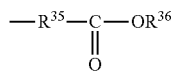

(i)

(wherein $R^{35}$ represents C1-C6 alkylene and $R^{36}$ represents C1-C24 alkyl or alkenyl),

[Chemical Formula 26]

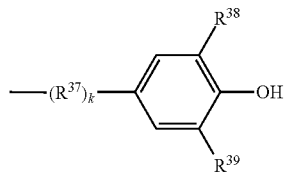

(ii)

(wherein $R^{37}$ represents C1-C6 alkylene, $R^{38}$ represents C1-C4 alkyl, $R^{39}$ represents hydrogen or C1-C4 alkyl, and k represents 0 or 1).]

[Chemical Formula 27]

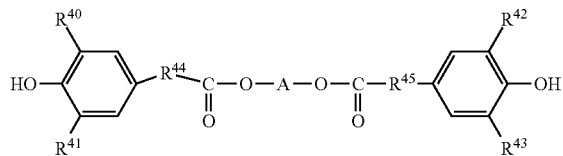

(2-15)

[wherein $R^{40}$ and $R^{42}$ are the same or different and each represents C1-C4 alkyl, $R^{41}$ and $R^{43}$ are the same or different and each represents hydrogen or C1-C4 alkyl, $R^{44}$ and $R^{45}$ are the same or different and each represents C1-C6 alkylene, and A represents C1-C18 alkylene or a group represented by the following general formula (iii):

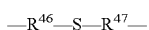

(iii)

(wherein $R^{46}$ and $R^{47}$ are the same or different and each represents C1-C6 alkylene)].

As amine-based antioxidants for the invention there may be used any amine-based compounds that are employed as antioxidants for lubricating oils, with no particular restrictions, and as preferred examples there may be mentioned one or more aromatic amines selected from among phenyl-α-naphthylamine or N-p-alkylphenyl-α-naphthylamines represented by the following general formula (2-16), and p,p'-dialkyldiphenylamines represented by the following general formula (2-17).

[Chemical Formula 28]

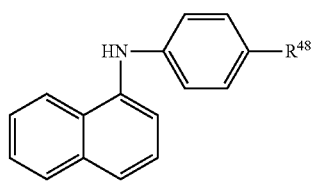

(2-16)

[wherein $R^{48}$ represents hydrogen or alkyl]

[Chemical Formula 29]

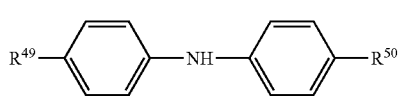

(2-17)

[wherein $R^{49}$ and $R^{50}$ are the same or different and each represents an alkyl group].

As specific examples of amine-based antioxidants there may be mentioned 4-butyl-4'-octyldiphenylamine, phenyl-α-naphthylamine, octylphenyl-α-naphthylamine, dodecylphenyl-α-naphthylamine, and mixtures thereof.

As zinc dithiophosphate-based antioxidants to be used for the invention there may be mentioned, specifically, zinc dithiophosphates represented by the following general formula (2-18).

[Chemical Formula 30]

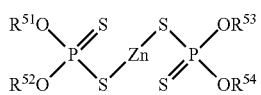

(2-18)

[wherein $R^{51}$, $R^{52}$, $R^{53}$ and $R^{54}$ are the same or different and each represents a hydrocarbon group].

Antioxidants employed as food additives may also be used, although these partially overlap with the aforementioned phenol-based antioxidants, and there may be mentioned as examples 2,6-di-tert-butyl-p-cresol (DBPC), 4,4'-methylenebis(2,6-di-tert-butylphenol), 4,4'-bis(2,6-di-tert-butylphenol), 4,4'-thiobis(6-tert-butyl-o-cresol), ascorbic acid (vitamin C), ascorbic acid fatty acid esters, tocopherol (vitamin E), 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediol (TBHQ) and 2,4,5-trihydroxybutyrophenone (THBP).

Preferred among these antioxidants are phenol-based antioxidants, amine-based antioxidants and antioxidants that are employed as food additives. The use of food additive antioxidants is especially preferred when biodegradability is a primary concern, and of these, ascorbic acid (vitamin C), ascorbic acid fatty acid esters, tocopherol (vitamin E), 2,6-di-tert-butyl-p-cresol (DBPC), 3,5-di-tert-butyl-4-hydroxyanisole, 2-tert-butyl-4-hydroxyanisole, 3-tert-butyl-4-hydroxyanisole, 1,2-dihydro-6-ethoxy-2,2,4-trimethylquinoline (ethoxyquin), 2-(1,1-dimethyl)-1,4-benzenediol (TBHQ) and 2,4,5-trihydroxybutyrophenone (THBP) are preferred, among which ascorbic acid (vitamin C), ascorbic acid fatty acid esters, tocopherol (vitamin E), 2,6-di-tert-butyl-p-cresol (DBPC) and 3,5-di-tert-butyl-4-hydroxyanisole are especially preferred.

There are no particular restrictions on the antioxidant content, but for maintenance of satisfactory heat and oxidation stability the content is preferably 0.01% by mass or greater, more preferably 0.05% by mass or greater and most preferably 0.1% by mass or greater based on the total composition weight. Since no corresponding effect can be expected with larger amounts of addition, the content is preferably no greater than 10% by mass, more preferably no greater than 5% by mass and most preferably no greater than 3% by mass.

The oil for metal working according to the second embodiment may also contain conventional publicly known additives in addition to the above. As examples of such additives there may be mentioned extreme pressure agents (including chlorine-based extreme pressure agents) other than the aforementioned phosphorus compounds and sulfur compounds; moistening agents such as diethyleneglycol monoalkylethers; film-forming agents such as acryl polymers, paraffin wax, microwax, slack wax and polyolefin wax; water displacement agents such as fatty acid amine salts; solid lubricants such as graphite, fluorinated graphite, molybdenum disulfide, boron nitride and polyethylene powder; corrosion inhibitors such as amines, alkanolamines, amides, carboxylic acids, carboxylic acid salts, sulfonic acid salts, phosphoric acid, phosphoric acid salts and polyhydric alcohol partial esters; metal inactivating agents such as benzotriazole and thiadiazole; defoaming agents such as methylsilicone, fluorosilicone and polyacrylate; and non-ash powders such as alkenylsuccinic imides, benzylamine and polyalkenylamineaminoamide. The contents of such publicly known additives when used in combination are not particularly restricted, but they are generally added in amounts so that the total content of the publicly known additives is 0.1-10% by mass based on the total composition weight.

The oil for metal working of the second embodiment may also contain chlorine-based additives such as chlorine-based extreme pressure agents as mentioned above, but from the viewpoint of improving stability and reducing the environmental burden, it preferably contains no chlorine-based additives. The chlorine concentration is preferably no greater than 1000 ppm by weight, more preferably no greater than 500 ppm by weight, even more preferably no greater than 200 ppm by weight and most preferably no greater than 100 ppm by weight, based on the total composition weight.

The dynamic viscosity of the oil for metal working of the second embodiment is not particularly restricted, but from the viewpoint of facilitating feeding of the oil to machining sites, the dynamic viscosity at 40° C. is preferably no greater than 200 mm$^2$/s, more preferably no greater than 100 mm$^2$/s, even more preferably no greater than 75 mm$^2$/s and most preferably no greater than 50 mm$^2$/s. The lower limit is preferably 1 mm$^2$/s, even more preferably 3 mm$^2$/s and most preferably 5 mm$^2$/s.

The oil for metal working according to the second embodiment having the construction described above exhibits excellent machining performance including working efficiency and tool life, as well as excellent handleability, and may therefore be suitably used for a wide range of purposes in the field of metal working. Here, metal working refers to metal working in general, without being restricted to cuffing and grinding. The oil for metal working of the second embodiment is also suitable for metal working with an ordinary oil-supply system, as well as cutting, grinding and roll forming with a minimal quantity lubricant system (MQL working).

As such types of metal working there may be mentioned, specifically, cutting, grinding, roll forming, forging, pressing, punching and rolling. Of these, the oil for metal working of the second embodiment is especially useful for use in cutting, grinding and roll forming. Due to more stringent requirements in recent years for working conditions and the continuing development of new workpiece materials in the fields of heavy machining, difficult machining and machining of difficult-to-cut materials and/or difficult-to-gring materials, increasingly higher performance is being demanded of oils for metal working, and the oil for metal working according to the second embodiment exhibits a more notable effect for such uses.

As heavy machining there may be mentioned shaving, deep hole boring (BTA working, gun drill working), broaching, screw roll forming, screw grinding and tool grinding.

As difficult machining there may be mentioned automatic lathe working and interior turning.

As machining of difficult-to-cut materials and/or difficult-to-gring materials there may be mentioned machining of difficult-to-cut materials and/or difficult-to-gring materials such as stainless steel, inconel and hardened steel.

The oil for metal working of the second embodiment can be used as a lubricating oil for sections other than working sites of machine tools, such as a sliding surface oil, bearing section oil, hydraulic equipment oil or the like, and is therefore highly useful from the standpoint of allowing savings in space and energy for machine tools.

A sliding surface oil according to the invention is a lubricating oil used in guiding mechanisms for sliding movement between two surfaces in contact, such as those of structural members of machine tools used for cutting and grinding. For example, in a machine tool wherein a working piece is set on a table capable of moving on a bed and the table is moved to transport the working piece toward a cutting/grinding tool, the sliding surface between the table and the bed is lubricated with a sliding surface oil. Or in a machine tool which fixes a cutting/grinding tool on a platform capable of moving on a bed and moves the platform to transport the tool toward a working piece, the sliding surface between the platform and bed is also lubricated with a sliding surface oil.

Such sliding surface oil must have satisfactory friction properties, including a small friction coefficient on the sliding surface and high anti-stick-slip properties. When stick-slip occurs on the sliding surface such as the working table of a machine tool, the frictional vibration is transferred to the workpiece thereby lowering the working precision, or the vibration may shorten the tool life. When used as a sliding surface oil, the metal composition of the invention can satisfactorily prevent these phenomena, but it preferably further contains a phosphorus compound from the standpoint of friction properties.

Lubrication methods such as oil bearing lubrication and mist bearing lubrication are employed for lubrication of bearing sections, and an oil composition according to the invention can be used for either type of method.

Oil bearing lubrication is a lubricating system whereby a lubricating oil is supplied directly as a liquid to the bearing section for smooth sliding of the section, and the bearing section is also cooled by the lubricating oil. Because such a lubricating oil for bearing lubrication is used at high-temperature sections it must be resistant to thermal degradation, i.e. it must have excellent heat resistance, and the oil for metal working of the second embodiment can be suitably used for such oil bearing lubrication.

Mist bearing lubrication is a lubricating system wherein the lubricating oil is atomized with a mist generator and the atomized oil is supplied to the bearing sections with a gas such as air to achieve smooth sliding of the sections, and since a cooling effect is provided by the air at the high-temperature sections such as bearing sections, this type of lubricating system is becoming more commonly used in recent years for machine tools. Because such a lubricating oil for mist lubrication is used at high-temperature sections it must also be resistant to thermal degradation, i.e. it must have excellent heat resistance, and the oil composition of the invention can also be suitably used for such mist bearing lubrication.

Hydraulic equipment accomplishes manipulation and control of machines by oil pressure, and hydraulic oil with a lubricating, sealing and cooling effect is used in hydraulic control sections that govern machine operation. Hydraulic oil is used by compressing lubricating oil at high pressure with a pump to produce oil pressure and move equipment, and therefore the lubricating oil must have high lubricity and high oxidation stability and thermal stability; the oil for metal working according to the second embodiment can also be used as a hydraulic oil. When the oil for metal working of the second embodiment is used as a general purpose hydraulic oil, it preferably contains a phosphorus compound for further improved lubricity.

An example of a cutting and grinding method using an oil for metal working according to the second embodiment will now be explained.

Figure 2:
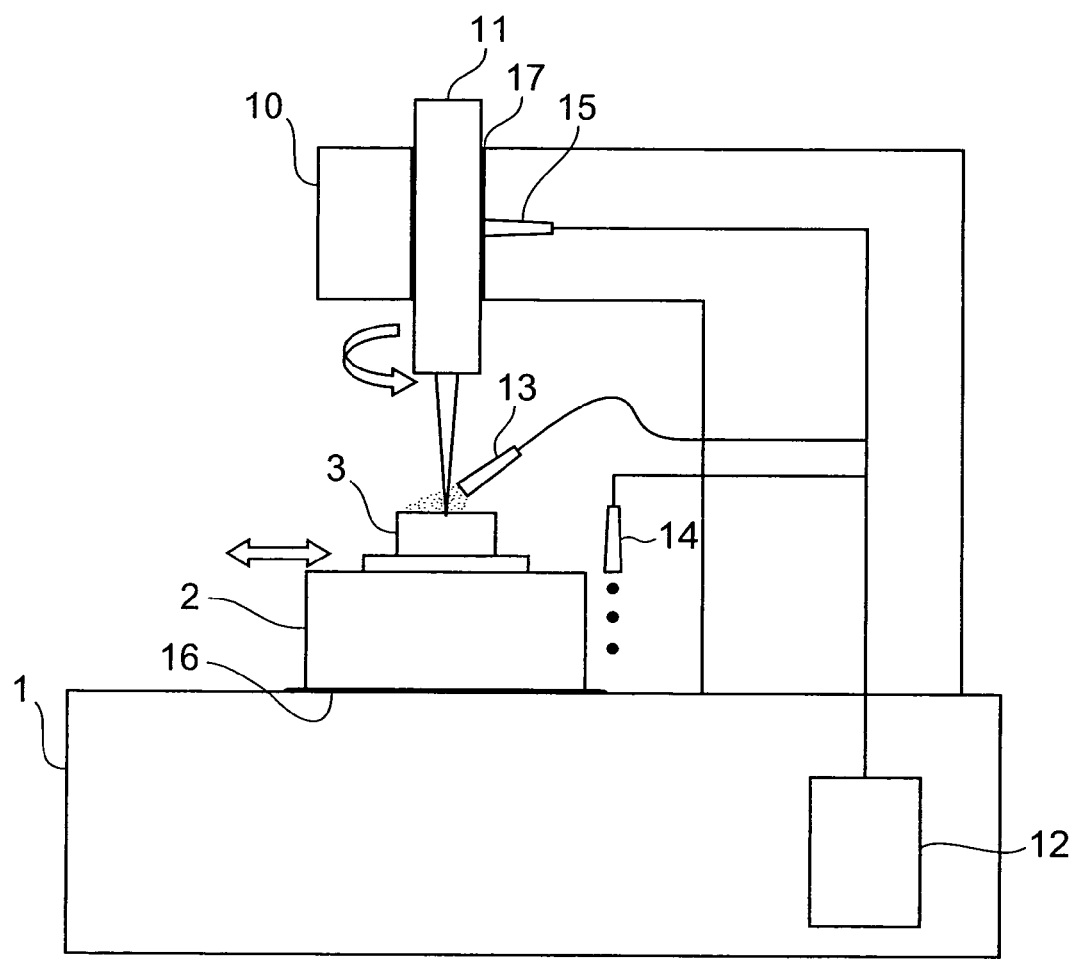
FIG. 2 is a schematic diagram showing an example of a machine tool suitable for use in a cutting/grinding method.

FIG. 2 is a schematic diagram showing an example of a machine tool suitable for use according to the invention. The machine tool shown in FIG. 2 comprises a table 2 which is movable in the direction of the arrow on a bed 1, and a tool 11 which is supported on support means 10 and is rotatable in the direction of the arrow. An oil for metal working according to the second embodiment is housed in an oil feeding tank 12, and during cutting/grinding of a workpiece 3 placed on the table 2, the oil for metal working of the second embodiment is supplied from the working oil feeding section 13 toward the working site. Also, the oil for metal working of the second embodiment housed in the oil feeding tank 12 is supplied from the sliding surface oil feeding section 14 to the sliding surface 16 between the bed 1 and the table 2, while also being supplied from the bearing oil feeding section 15 to the bearing section between the support means 10 and tool 11, for lubrication of the sliding surface 16 and the bearing section 17.

Using the oil for metal working according to the second embodiment for lubrication of the cutting/grinding site, the machine tool sliding surface or the bearing section in this lubrication method can improve the workability for cutting/grinding and increase working efficiency.

Also, while not shown in the drawing, the oil for metal working of the second embodiment housed in the oil feeding tank 12 may be supplied to hydraulic equipment provided with the machine tool for use as a hydraulic oil. Furthermore, the oil for metal working of the second embodiment housed in the oil feeding tank 12 may be supplied to a gear section provided with the machine tool for use as a gear oil.

EXAMPLES

The present invention will now be explained in further detail by examples and comparative examples, with the understanding that the invention is in no way limited by the examples.

Examples 1-18 and Comparative Examples 1-3

For Examples 1-18 and Comparative Examples 1-2, oils for metal working were prepared using the base oils A-E and additives a-c listed below. Table 1 shows the fatty acid composition, total degree of unsaturation, viscosity at 15° C., dynamic viscosity at 40° C., viscosity index, acid value and iodine value for each of the base oils A, B and E, and the viscosity at 15° C., dynamic viscosity at 40° C., viscosity index, acid value and iodine value for each of the base oils C and D. Also, the composition and dynamic viscosity at 40° C. for each of the base oils of Examples 1-15 and Comparative Examples 1-3 are shown in Tables 2 to 5.
(Base Oils)
A: high-oleic-acid rapeseed oil
B: high-oleic-acid sunflower oil
C: methyl oleate
D: diisodecyl adipate
E: rapeseed shirashime oil
(Additives)
a: tricresyl phosphate
b: sulfidized ester
c: 2,6-di-tert-butyl-p-cresol.

The following evaluation tests were conducted using the oils of

Examples 1-18 and Comparative Examples 1 and 2.

[Anti-Sticking Evaluation]
After placing 5 ml of oil on an aluminum dish (100 mm×70 mm), it was allowed to stand for 168 hours in a thermostatic bath at 70° C., and then the degree of sticking at the oil-adhering sections was judged by finger contact. The results are shown in Tables 2-5. The following scale was used for evaluation of the anti-sticking property.
A: Absolutely no sticking
B: Absolutely no sticking, or only very slight sticking
C: Slight sticking
D: Sticking
E: Considerable sticking
[Lubricity evaluation (tapping test)]
Each oil and a comparative standard oil (DIDA: diisodecyl adipate) were used alternately for a tapping test under the following conditions. For Comparative Example 3, the tapping test was conducted in the same manner but using no oil and simply spraying compressed air.
(Tapping Conditions)
Tool: Nut tap M8 (P=1.25 mm)
Lower hole diameter: φ7.2 mm
Workpiece: S25C (t=10 mm)
Cutting speed: 9.0 m/min
(Oil supply system)
Oil: Spraying under conditions of 25 ml/h oil composition, with 0.2 MPa compressed air
DIDA: Direct spraying of the working site under conditions of 4.3 ml/min without using compressed air
The tapping energy for both the oil and comparative standard oil were thus measured, and the following formula was used to calculate the tapping energy efficiency (%). The results are shown in Tables 2-5. In the tables, a higher value for the tapping energy efficiency indicates higher lubricity. Tapping energy efficiency (%)=(tapping energy using DIDA)/(tapping energy using oil composition)

(Property Evaluation Test as Sliding Surface Oil)

Figure 3:
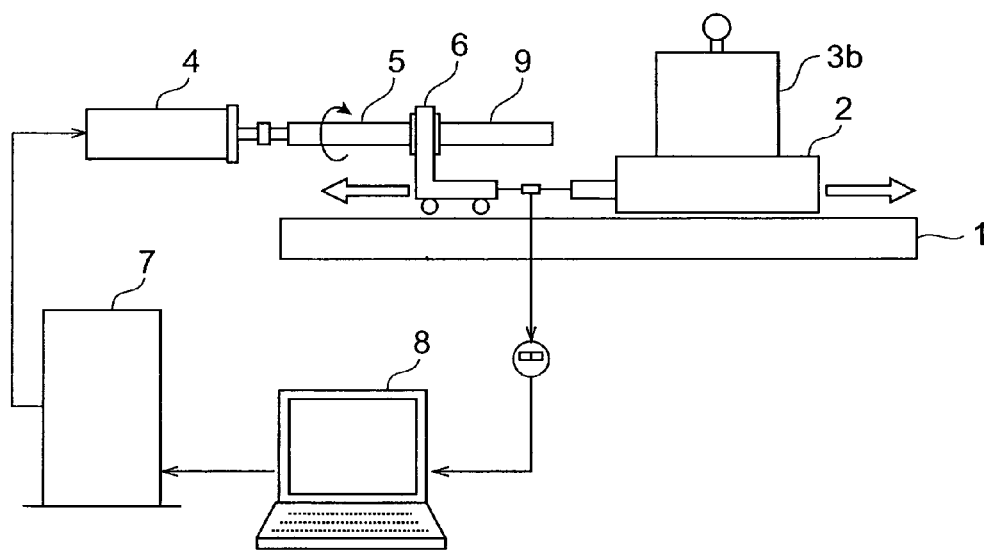
FIG. 3 is a schematic diagram showing an apparatus used for property evaluation testing, when using the oil as a sliding surface oil in the examples.

The apparatus shown in FIG. 3 was used to evaluate the properties of each oil as a sliding surface oil, according to the following procedure.

In the apparatus shown in FIG. 3, the oil was dropped onto the surface of contact between a cast-iron bed 1 and a cast-iron table 2. A weight 3b was then placed on the table 2 for a contact pressure of 200 kPa, and the table 2 was moved reciprocally in the direction of the arrow using driving means constructed with a mobile jig 6 comprising an A/C servo meter 4, a feed screw 5 and a bearing section. During the reciprocal motion of the table 2, a control board 7 and control means 8 were used to control the feed rate to 400 mm/min and the feed length to 300 mm. After three reciprocations of the table 2 in this manner, the load between the table 2 and the mobile jig 6 was measured with a load cell 9 at the 4th reciprocation, and the measured value was used to determine the average value for the friction coefficient of the contact surface (guiding surface) between the table and bed. The results are shown in Tables 2-5.

(Property Evaluation Test as Hydraulic Oil, Bearing Oil and Gear Oil)

Wear resistance evaluation testing was conducted to evaluate the properties of each oil as a hydraulic oil, bearing oil and gear oil.

For the wear resistance evaluation testing, a wear test was conducted by the high-speed four-ball test method for 30 minutes with a rotation rate of 1800 rpm and a load of 392 N, and the wear scar diameter was measured. The results are shown in Tables 2-5.

(Oxidation Stability Test)

After placing 25 ml of sample in a 50 ml screw tube, it was heated for 4 weeks in air at 70° C., and the change in acid value was measured. The results are shown in Tables 2-5.

TABLE 1

|  |  | Base oil A High-oleic rapeseed oil | Base oil B High-oleic sunflower oil | Base oil C Methyl oleate | Base oil D Diisodecyl adipate | Base oil E Rapeseed shirashime oil |
|---|---|---|---|---|---|---|
| Fatty acid composition [% by mass] | Oleic acid | 64 | 80 |  |  | 20 |
|  | Linoleic acid | 20 | 8 |  |  | 65 |
|  | Palmitic acid | 5 | 7 |  |  | 6 |
|  | Stearic acid | 2 | 3 |  |  | 5 |
|  | Other | 9 | 2 |  |  | 4 |
|  | C6-C16 fatty acids | 9 | 9 |  |  | 8 |
| Total unsaturated degree |  | 0.26 | 0.16 |  |  | 0.47 |
| Density at 15° C. [g/cm$^3$] |  | 0.92 | 0.92 | 0.88 | 0.92 | 0.92 |
| Dynamic viscosity at 40° C. [mm$^2$/s] |  | 38.72 | 39.5 | 4.5 | 14 | 35.6 |
| Viscosity index |  | 206 | 202 | 160 | 229 | 210 |
| Acid value [mgKOH/g] |  | 0.04 | 0.08 | 0.10 | 0.01 | 0.04 |
| Iodine value |  | 94.8 | 88 | 90 | 1 | 114 |

TABLE 2

|  |  | Example 1 | Example 2 | Example 3 | Example 4 | Example 5 | Example 6 |
|---|---|---|---|---|---|---|---|
| Composition [% by mass] | Base oil A | 100 | 95.00 | 95.0 | 99.5 | 47.25 | 47.25 |
|  | Base oil B | — | — | — | — | 47.25 | 47.25 |
|  | Base oil C | — | — | — | — | — | — |
|  | Base oil D | — | — | — | — | — | — |
|  | Base oil E | — | — | — | — | — | — |
|  | Additive a | — | 5.0 | — | — | — | 2.0 |
|  | Additive b | — | — | 5.0 | — | 5.0 | 3.0 |
|  | Additive c | — | — | — | 0.5 | 0.5 | 0.5 |
| Dynamic viscosity at 40° C. [mm$^2$/s] |  | 39 | 39 | 39 | 39 | 39 | 39 |
| Anti-sticking property |  | C | C | C | A | A | A |
| Lubricity (Tapping energy efficiency [%]) |  | 98 | 110 | 98 | 111 | 109 | 115 |
| Friction property (Mean friction coefficient) |  | 0.145 | 0.131 | 0.136 | 0.146 | 0.133 | 0.128 |
| Abrasion resistance (Wear scars [μm]) |  | 0.70 | 0.60 | 0.61 | 0.61 | 0.61 | 0.58 |
| Oxidation stability (Total acid value change [mgKOH/g]) |  | 0.22 | 0.15 | 0.21 | 0.01 | 0.03 | 0.01 |

TABLE 3

|  |  | Example 7 | Example 8 | Example 9 | Example 10 | Example 11 | Example 12 |
|---|---|---|---|---|---|---|---|
| Composition [% by mass] | Base oil A | — | — | 50.0 | 50.0 | 47.5 | 47.5 |
|  | Base oil B | 100 | 95.0 | — | — | — | — |
|  | Base oil C | — | — | 50.0 | — | 47.5 | — |
|  | Base oil D | — | — | — | 50.0 | — | 47.5 |
|  | Base oil E | — | — | — | — | — | — |
|  | Additive a | — | 5.0 | — | — | 5.0 | 5.0 |
|  | Additive b | — | — | — | — | — | — |
|  | Additive c | — | — | — | — | — | — |
| Dynamic viscosity at 40° C. [mm²/s] | | 40 | 40 | 10 | 23 | 10 | 23 |
| Anti-sticking property | | C | C | C | B | C | B |
| Lubricity (Tapping energy efficiency[%]) | | 98 | 110 | 98 | 105 | 115 | 119 |
| Friction property (Mean friction coefficient) | | 0.147 | 0.133 | 0.145 | 0.142 | 0.128 | 0.127 |
| Abrasion resistance (Wear scars [µm]) | | 0.71 | 0.61 | 0.70 | 0.67 | 0.63 | 0.61 |
| Oxidation stability (Total acid value change [mgKOH/g]) | | 0.22 | 0.22 | 0.21 | 0.15 | 0.15 | 0.08 |

TABLE 4

|  |  | Example 13 | Example 14 | Example 15 | Example 16 | Example 17 | Example 18 |
|---|---|---|---|---|---|---|---|
| Composition [% by mass] | Base oil A | 47.5 | 47.5 | 49.75 | 49.75 | 45.75 | 45.75 |
|  | Base oil B | — | — | — | — | — | — |
|  | Base oil C | 47.5 | — | 49.75 | — | 45.75 | — |
|  | Base oil D | — | 47.5 | — | 49.75 | — | 45.75 |
|  | Base oil E | — | — | — | — | — | — |
|  | Additive a | — | — | — | — | 2.0 | 2.0 |
|  | Additive b | 5.0 | 5.0 | — | — | 3.0 | 3.0 |
|  | Additive c | — | — | 0.5 | 0.5 | 0.5 | 0.5 |
| Dynamic viscosity at 40° C. [mm²/s] | | 10 | 23 | 10 | 23 | 10 | 23 |
| Anti-sticking property | | C | B | A | A | A | A |
| Lubricity (Tapping energy efficiency[%]) | | 112 | 115 | 105 | 106 | 127 | 125 |
| Friction property (Mean friction coefficient) | | 0.131 | 0.130 | 0.143 | 0.141 | 0.125 | 0.123 |
| Abrasion resistance (Wear scars [µm]) | | 0.63 | 0.60 | 0.68 | 0.68 | 0.56 | 0.54 |
| Oxidation stability (Total acid value change [mgKOH/g]) | | 0.27 | 0.24 | 0.01 | 0.01 | 0.01 | 0.01 |

TABLE 5

|  |  | Comp. Ex. 1 | Comp. Ex. 2 | Comp. Ex. 3 |
|---|---|---|---|---|
| Composition [% by mass] | Base oil A | — | — | No oil used |
|  | Base oil B | — | — | |
|  | Base oil C | 100 | — | |
|  | Base oil D | — | — | |
|  | Base oil E | — | 100 | |
|  | Additive a | — | — | |
|  | Additive b | — | — | |
|  | Additive c | — | — | |
| Dynamic viscosity at 40° C. [mm²/s] | | 4.5 | 38 | |
| Anti-sticking property | | E | E | |
| Lubricity (Tapping energy efficiency[%]) | | 93 | 80 | 80 |
| Friction property (Mean friction coefficient) | | 0.156 | 0.148 | |
| Abrasion resistance (Wear scars [µm]) | | 0.73 | 0.73 | |
| Oxidation stability (Total acid value change [mgKOH/g]) | | 0.42 | 0.45 | |

Examples 19-30, and Comparative Examples 4-15

For Examples 19-30 and Comparative Examples 4-15, metal working oil compositions were prepared having the compositions listed in Tables 7 to 11, using the base oils listed in Table 6 and the additives listed below. The high-oleic-acid rapeseed oils, high-oleic-acid sunflower oils and rapeseed shirashime oils used in these examples consisted essentially of fatty acid and glycerin triesters, and the triesters had the fatty acid compositions listed in Table 6. Also, the contents of the high-oleic-acid rapeseed oils, high-oleic-acid sunflower oils and rapeseed shirashime oils listed in Table 7 correspond to triester contents according to the invention.

(Additives)
Additive a: tricresyl phosphate (TCP)
Additive b: sulfidized ester
Additive c: calcium sulfonate (Ca sulfonate)
Additive d: 2,6-di-tert-butyl-p-cresol (DBPC)

TABLE 6

|  |  | Base oil A | Base oil B | Base oil C | Base oil D |
|---|---|---|---|---|---|
|  |  | Type | | | |
|  |  | SAE10 | High-oleic-acid rapeseed oil | High-oleic-acid sunflower oil | Rapeseed shirashime oil |
| Fatty acid | Oleic acid | — | 64 | 80 | 20 |
| composition | Linoleic acid | — | 20 | 8 | 65 |
| of glycerin | Palmitic acid | — | 5 | 7 | 6 |
| triester | Stearic acid | — | 2 | 3 | 5 |
| (% by mass) | Other | — | 9 | 2 | 4 |
| Content of C6-C16 fatty acids of total amount of the fatty acids (% by mass) | | — | 9 | 9 | 8 |
| Total unsaturated degree | | — | 0.26 | 0.16 | 0.47 |
| Density at 15° C. ($g/cm^3$) | | 0.86 | 0.92 | 0.92 | 0.92 |
| Dynamic viscosity at 40° C. ($mm^2/s$) | | 19.6 | 38.72 | 39.5 | 35.6 |
| Viscosity index | | 103 | 206 | 202 | 210 |
| Acid value (mgKOH/g) | | 0.02 | 0.04 | 0.08 | 0.04 |
| Iodine value | | 0 | 94.8 | 88 | 114 |

The obtained metal working oil compositions were subjected to the following evaluation tests.

(Tapping Test)

The machining performances of the metal working oil compositions of Examples 19 and 20 and Comparative Example 5 were evaluated, using the metal working oil composition of Comparative Example 4 as the comparative standard oil. Specifically, the metal working oil composition of Example 19 or 20 or Comparative Example 5 was used alternately with the metal working oil composition of Comparative Example 4 for a tapping test under the following conditions. The metal working oil composition was supplied to the working site by direct spraying onto the working site under conditions of 4.3 ml/min.
Tool: Nut tap M8 (P=1.25 mm)
Lower hole diameter: φ6.8 mm
Workpiece: S25C (t=10 mm)
Cutting speed: 9.0 m/min The tapping energy was measured in the test described above, and the following formula was used to calculate the tapping energy efficiency (%).
Tapping energy efficiency (%)=(tapping energy using comparative standard oil)/(tapping energy using metal working oil composition)

The results are shown in Table 7. In the table, a higher value for the tapping energy efficiency indicates higher lubricity.

A tapping test was conducted in the same manner as above for the metal working oil compositions of Examples 21-30 and Comparative Examples 6-15, except that the metal working oil composition of Comparative Example 5 was used as the comparative standard oil, and the test conditions were as listed below. The results are shown in Tables 8 to 11.
Tool: Nut tap M8 (P=1.25 mm)
Lower hole diameter: φ7.0 mm
Workpiece: SUS430 (t=10 mm)
Cutting speed: 9.0 m/min (Oxidation Stability Test)

The metal working oil compositions of Examples 19-30 and Comparative Examples 4-15 were subjected to oxidation stability testing. Specifically, an annealed iron billet conforming to JIS G 3532 (SWM-A, φ1.6 mm, 400 mm length) and an electrolytic copper wire conforming to JIS G 3102 (purity: >99.9%, φ1.6 mm, length: 400 mm) were each polished with #100 sandpaper and coiled up with a catalytic coil machine conforming to JIS K 2514. The coiled annealed iron billet and electrolytic copper wire were weighed out to a 45 g sample and placed in a test container, and held in a thermostatic bath at 120° C. for 14 days. An 0.8μ filter (NIHON MILLIPORE LTD) was then used for filtration of the sample, and the amount of sludge remaining on the filter was measured. The results are shown in Tables 7 to 11.

(Friction Property Evaluation Test)

The apparatus shown in FIG. 3 was used to evaluate the friction properties of the metal working oil compositions of Examples 21-30 and Comparative Examples 6-15 according to the following procedure.

In the apparatus shown in FIG. 3, the oil was dropped onto the surface of contact between a cast-iron bed 1 and a cast-iron table 2. A weight 3b was then placed on the table 2 for a contact pressure of 200 kPa, and the table 2 was moved back and forth in the direction of the arrow using driving means constructed with a mobile jig 6 comprising an A/C servo meter 4, a feed screw 5 and a bearing section. During the back and forth motion of the table 2, a control board 7 and control means 8 were used to control the feed rate to 400 mm/min and the feed length to 300 mm. After three reciprocations of the table 2 in this manner, the load between the table 2 and the mobile jig 6 was measured with a load cell 9 at the 4th reciprocation, and the measured value was used to determine the average value for the friction coefficient of the contact surface (guiding surface) between the table and bed. The results are shown in Tables 8 to 11.

(Wear Resistance Evaluation Test)

The metal working oil compositions of Examples 21-30 and Comparative Examples 6-15 were subjected to a high-speed four-ball test for 30 minutes with a rotation rate of 1800 rpm and a load of 392 N, and the wear scar diameter was measured for evaluation of the wear resistance of each oil. The results are shown in Tables 8 to 11.

TABLE 7

|  |  |  | Example 19 | Example 20 | Comp. Ex. 4 | Comp. Ex. 5 |
|---|---|---|---|---|---|---|
| Composition (% by mass) | Base oil A | SAE10 | 79.76 | 79.76 | 99.70 | 79.76 |
|  | Base oil B | High-oleic rapeseed oil | 19.94 | — | — | — |
|  | Base oil C | High-oleic sunflower oil | — | 19.94 | — | — |
|  | Base oil D | Rapeseed shirashime oil | — | — | — | 19.94 |
|  | Additive a | TCP | — | — | — | — |
|  | Additive b | Sulfidized ester | — | — | — | — |
|  | Additive c | Ca sulfonate | — | — | — | — |
|  | Additive d | DBPC | 0.30 | 0.30 | 0.30 | 0.30 |
| Dynamic viscosity at 40° C. (mm$^2$/s) |  |  | 28 | 28 | 21 | 27 |
| Tapping test | Tapping energy efficiency (%) |  | 117 | 121 | 100 | 110 |
| Oxidation stability | Sludge weight (mg/45 g) |  | 0.28 | 0.25 | 0.10 | 0.41 |

TABLE 8

|  |  |  | Example 21 | Example 22 | Example 23 | Example 24 | Example 25 |
|---|---|---|---|---|---|---|---|
| Composition (% by mass) | Base oil A | SAE10 | 75.76 | 71.76 | 75.76 | 71.76 | 67.76 |
|  | Base oil B | High-oleic rapeseed oil | 18.94 | 17.94 | 18.94 | 17.94 | 16.94 |
|  | Base oil C | High-oleic sunflower oil | — | — | — | — | — |
|  | Base oil D | Rapeseed shirashime oil | — | — | — | — | — |
|  | Additive a | TCP | 5.00 | — | — | 5.00 | 5.00 |
|  | Additive b | Sulfidized ester | — | 10.00 | — | — | 10.00 |
|  | Additive c | Ca sulfonate | — | — | 5.00 | 5.00 | — |
|  | Additive d | DBPC | 0.30 | 0.30 | 0.30 | 0.30 | 0.30 |
| Dynamic viscosity at 40° C. (mm$^2$/s) |  |  | 28 | 28 | 28 | 28 | 28 |
| Tapping test | Tapping energy efficiency (%) |  | 115 | 116 | 106 | 120 | 125 |
| Oxidation stability | Sludge weight (mg) |  | 0.30 | 3.50 | 1.20 | 0.45 | 2.60 |
| Friction property | Mean friction coefficient |  | 0.132 | 0.135 | 0.141 | 0.128 | 0.121 |
| Abrasion resistance | Wear scars (μm) |  | 0.61 | 0.60 | 0.68 | 0.58 | 0.55 |

TABLE 9

|  |  |  | Example 26 | Example 27 | Example 28 | Example 29 | Example 30 |
|---|---|---|---|---|---|---|---|
| Composition (% by mass) | Base oil A | SAE10 | 67.76 | 63.76 | 71.76 | 67.76 | 63.76 |
|  | Base oil B | High-oleic rapeseed oil | 16.94 | 15.94 | 17.94 | 16.94 | 15.94 |
|  | Base oil C | High-oleic sunflower oil | — | — | — | — | — |
|  | Base oil D | Rapeseed shirashime oil | — | — | — | — | — |
|  | Additive a | TCP | — | 5.00 | 5.00 | — | 5.00 |
|  | Additive b | Sulfidized ester | 10.00 | 10.00 | — | 10.00 | 10.00 |
|  | Additive c | Ca sulfonate | 5.00 | 5.00 | 5.00 | 5.00 | 5.00 |
|  | Additive d | DBPC | 0.30 | 0.30 | 0.30 | 0.30 | 0.30 |
| Dynamic viscosity at 40° C. (mm$^2$/s) |  |  | 28 | 28 | 28 | 28 | 28 |
| Tapping test | Tapping energy efficiency (%) |  | 123 | 135 | 123 | 126 | 136 |
| Oxidation stability | Sludge weight (mg) |  | 3.70 | 2.81 | 2.43 | 3.31 | 2.71 |
| Friction property | Mean friction coefficient |  | 0.125 | 0.120 | 0.122 | 0.126 | 0.119 |
| Abrasion resistance | Wear scars (μm) |  | 0.60 | 0.54 | 0.59 | 0.60 | 0.57 |

TABLE 10

|  |  |  | Comp. Ex. 6 | Comp. Ex. 7 | Comp. Ex. 8 | Comp. Ex. 9 | Comp. Ex. 10 |
|---|---|---|---|---|---|---|---|
| Composition (% by mass) | Base oil A | SAE10 | 94.70 | 89.70 | 94.70 | 89.70 | 84.70 |
|  | Base oil B | High-oleic rapeseed oil | — | — | — | — | — |

TABLE 10-continued

|  |  | Comp. Ex. 6 | Comp. Ex. 7 | Comp. Ex. 8 | Comp. Ex. 9 | Comp. Ex. 10 |
|---|---|---|---|---|---|---|
| Base oil C | High-oleic sunflower oil | — | — | — | — | — |
| Base oil D | Rapeseed shirashime oil | — | — | — | — | — |
| Additive a | TCP | 5.00 | — | — | 5.00 | 5.00 |
| Additive b | Sulfidized ester | — | 10.00 | — | — | 10.00 |
| Additive c | Ca sulfonate | — | — | 5.00 | 5.00 | — |
| Additive d | DBPC | 0.30 | 0.30 | 0.30 | 0.30 | 0.30 |
| Dynamic viscosity at 40° C. (mm$^2$/s) | | 21 | 22 | 22 | 22 | 22 |
| Tapping test | Tapping energy efficiency (%) | 97 | 100 | 92 | 103 | 110 |
| Oxidation stability | Sludge weight (mg) | 0.42 | 3.50 | 1.31 | 0.34 | 2.89 |
| Friction property | Mean friction coefficient | 0.146 | 0.142 | 0.149 | 0.142 | 0.135 |
| Abrasion resistance | Wear scars (μm) | 0.63 | 0.64 | 0.70 | 0.63 | 0.61 |

TABLE 11

|  |  |  | Comp. Ex. 11 | Comp. Ex. 12 | Comp. Ex. 13 | Comp. Ex. 14 | Comp. Ex. 15 |
|---|---|---|---|---|---|---|---|
| Composition (% by mass) | Base oil A | SAE10 | 84.70 | 79.70 | 71.76 | 67.76 | 63.76 |
|  | Base oil B | High-oleic rapeseed oil | — | — | — | — | — |
|  | Base oil C | High-oleic sunflower oil | — | — | — | — | — |
|  | Base oil D | Rapeseed shirashime oil | — | — | 17.94 | 16.94 | 15.94 |
|  | Additive a | TCP | — | 5.00 | 5.00 | — | 5.00 |
|  | Additive b | Sulfidized ester | 10.00 | 10.00 | — | 10.00 | 10.00 |
|  | Additive c | Ca sulfonate | 5.00 | 5.00 | 5.00 | 5.00 | 5.00 |
|  | Additive d | DBPC | 0.30 | 0.30 | 0.30 | 0.30 | 0.30 |
| Dynamic viscosity at 40° C. (mm$^2$/s) | | | 22 | 23 | 28 | 28 | 28 |
| Tapping test | Tapping energy efficiency (%) | | 105 | 112 | 115 | 118 | 128 |
| Oxidation stability | Sludge weight (mg) | | 3.81 | 2.71 | 0.88 | 6.11 | 5.01 |
| Friction property | Mean friction coefficient | | 0.144 | 0.131 | 0.128 | 0.131 | 0.128 |
| Abrasion resistance | Wear scars (μm) | | 0.63 | 0.61 | 0.62 | 0.63 | 0.59 |

The invention claimed is:

1. An oil for metal working, comprising
a triester of fatty acids and glycerin of no less than 45.75% by mass based on a total amount of the oil,
wherein the content of oleic acid in the fatty acids is 64-80% by mass and the content of linoleic acid in the fatty acids is 8-20% by mass, based on the total amount of the fatty acids; and
wherein the triester has a kinematic viscosity at 40° C. of 5-75 mm$^2$/s, a total degree of unsaturation of 0.16-0.26, and a viscosity index of 202-206;
a phosphoric acid ester of 2.0-5.0% by mass based on the total amount of the oil;
a sulfidizied ester of 3.0-10.0% by mass based on the total amount of the oil; and
optionally an antioxidant and/or a sulfonate.

2. The oil for metal working according to claim 1, further comprising a hydrocarbon oil.

3. The oil for metal working according to claim 1, wherein a content of C1-C16 fatty acids in the fatty acids is 0.1-30% by mass based on the total amount of the fatty acids.

4. The oil for metal working according to claim 1, wherein a content of C6-C16 fatty acids in the fatty acids is 0.1-30% by mass based on the total amount of the fatty acids.

5. The oil for metal working according to claim 1, further comprising a diester.

6. The oil for metal working according to claim 1, being used as a cutting oil, a grinding oil or a roll forming oil.

7. The oil for metal working according to claim 1, being used as a metal working oil for heavy machining, a metal working oil for difficult machining or a metal working oil for machining of difficult-to-cut materials and/or difficult-to-grind materials.

8. The oil for metal working according to claim 1, being used as an oil for metal working with a minimal quantity lubricant system.

* * * * *